(12) United States Patent
Kobayashi et al.

(10) Patent No.: US 10,979,411 B2
(45) Date of Patent: Apr. 13, 2021

(54) AUTHENTICATION CONTROL SYSTEM, SERVER APPARATUS, CLIENT APPARATUS, AUTHENTICATION CONTROL METHOD, AUTHENTICATION METHOD, AND PROGRAM

(71) Applicants: NIPPON TELEGRAPH AND TELEPHONE CORPORATION, Tokyo (JP); NTT Innovation Institute, Inc., East Palo Alto, CA (US)

(72) Inventors: Tetsutaro Kobayashi, Tokyo (JP); Hitoshi Fuji, Tokyo (JP); Akira Nagai, Tokyo (JP); Go Yamamoto, East Palo Alto, CA (US)

(73) Assignees: NIPPON TELEGRAPH AND TELEPHONE CORPORATION, Tokyo (JP); NTT Innovation Institute, Inc., East Palo Alto, CA (US)

( * ) Notice: Subject to any disclaimer, the term of this patent is extended or adjusted under 35 U.S.C. 154(b) by 342 days.

(21) Appl. No.: 15/781,292

(22) PCT Filed: Dec. 15, 2016

(86) PCT No.: PCT/JP2016/087386
§ 371 (c)(1),
(2) Date: Jun. 4, 2018

(87) PCT Pub. No.: WO2017/104750
PCT Pub. Date: Jun. 22, 2017

(65) Prior Publication Data
US 2018/0359234 A1 Dec. 13, 2018

Related U.S. Application Data

(60) Provisional application No. 62/269,598, filed on Dec. 18, 2015.

(51) Int. Cl.
*H04L 29/06* (2006.01)
*G06F 21/45* (2013.01)
(Continued)

(52) U.S. Cl.
CPC .............. *H04L 63/08* (2013.01); *G06F 21/31* (2013.01); *G06F 21/45* (2013.01); *H04L 9/14* (2013.01);
(Continued)

(58) Field of Classification Search
CPC ......... G06F 21/31; G06F 21/45; H04L 63/08; H04L 63/0815; H04L 63/0892; H04L 9/14
See application file for complete search history.

(56) References Cited

U.S. PATENT DOCUMENTS

2007/0118891 A1* 5/2007 Buer ................. G06F 21/445
726/8
2008/0258864 A1 10/2008 Hattori et al.
(Continued)

FOREIGN PATENT DOCUMENTS

| CN | 102377765 A | 3/2012 |
|---|---|---|
| JP | 2014-143568 | 8/2014 |
| WO | WO 2006/046289 A1 | 5/2006 |

OTHER PUBLICATIONS

Office Action dated Jun. 11, 2019 in corresponding Japanese Patent Application No. 2017-556441 (with English Translation), 12 pages.
(Continued)

*Primary Examiner* — Thaddeus J Plecha
(74) *Attorney, Agent, or Firm* — Oblon, McClelland, Maier & Neustadt, L.L.P.

(57) ABSTRACT

A client apparatus converts second input authentication information having a data content compliant with a second authentication method different from a first authentication
(Continued)

method into authentication target information in a data format compliant with the first authentication method and transmits information corresponding to the authentication target information to a communication server apparatus. A server apparatus is capable of carrying out both a first process of providing a first authentication server apparatus that carries out an authentication process compliant with the first authentication method with first information corresponding to the authentication target information and a second process of providing a second authentication server apparatus that carries out an authentication process compliant with the second authentication method with second information corresponding to the authentication target information. The server apparatus transmits authentication result information based on at least one of a result of the authentication performed by the first authentication server apparatus based on the first information and a result of the authentication performed by the second authentication server apparatus based on the second information to the communication server apparatus.

24 Claims, 8 Drawing Sheets

(51) Int. Cl.
*H04L 9/14* (2006.01)
*H04L 9/32* (2006.01)
*G06F 21/31* (2013.01)

(52) U.S. Cl.
CPC .......... *H04L 9/3226* (2013.01); *H04L 9/3247* (2013.01)

(56) References Cited

U.S. PATENT DOCUMENTS

| | | | |
|---|---|---|---|
| 2009/0024751 A1 | 1/2009 | Taniguchi et al. | |
| 2010/0037303 A1 | 2/2010 | Sharif et al. | |
| 2012/0005742 A1* | 1/2012 | Chen ................. | H04W 12/0609 726/12 |
| 2012/0054840 A1* | 3/2012 | Gupta ............... | H04W 12/0608 726/5 |
| 2014/0123231 A1 | 5/2014 | Low et al. | |
| 2014/0205095 A1 | 7/2014 | Ittogi | |
| 2014/0331337 A1* | 11/2014 | Factor ..................... | G06F 21/62 726/30 |
| 2015/0096000 A1 | 4/2015 | Sharif et al. | |
| 2015/0227732 A1* | 8/2015 | Doctor ................... | H04L 63/08 726/4 |

OTHER PUBLICATIONS

Partial Supplementary European Search Report dated May 22, 2019 in corresponding European Patent Application No. 16875727.6, 12 pages.
DesigNET, "Entry-level LDAP/OpenLDAP directory service introduction/operation guidebook," May 5, 2012, Shuwa System Co., Ltd, pp. 148-150 (with English translation).
Nat Sakimura, John Bradley, Michael B. Jones, Breno de Medeiros, Chuck Mortimore, "OpenID Connect Core 1.0—draft 17," [online], [Searched on Nov. 28, 2015], Internet http://openid.net/specs/openid-connect-core-1_0.html (78 Pages).
International Search Report dated Feb. 21, 2017 in PCT/JP2016/087386, filed Dec. 15, 2016.
Extended European Search Report dated Aug. 23, 2019 in Patent Application No. 16875727.6, 11 pages.

* cited by examiner

Fig. 6A
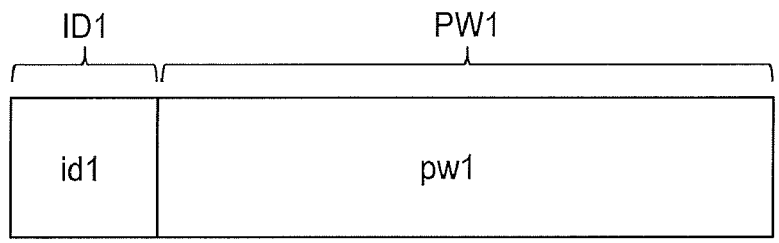
Fig. 6B
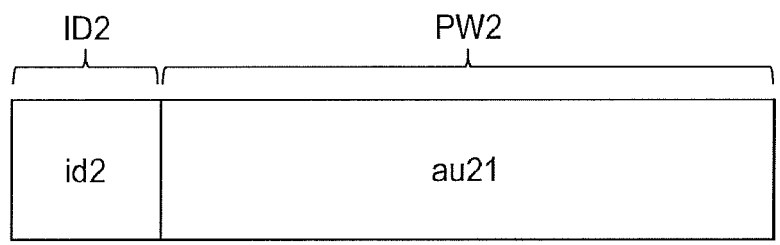
Fig. 6C
| IDENTIFIER | AUTHENTICATION METHOD |
|---|---|
| id1 | sc1 |
| id2 | sc2 |
| ⋮ | ⋮ |
| id1000 | sc1 |

AUTHENTICATION CONTROL SYSTEM, SERVER APPARATUS, CLIENT APPARATUS, AUTHENTICATION CONTROL METHOD, AUTHENTICATION METHOD, AND PROGRAM

TECHNICAL FIELD

The present invention relates to cryptography, and particularly to an authentication technology.

BACKGROUND ART

Several access control methods for accessing a resource on a network have been proposed (see Non-patent literatures 1 and 2, for example). The most frequently used method is a "password authentication method." In the password authentication method, a client apparatus accesses a communication server apparatus (such as web server) and transmits an identifier id stored in an identifier area ID and a password pw stored in a password area PW, as shown in FIG. 8. The communication server apparatus sends id and pw to an authentication server apparatus (such as LDAP server). The authentication server apparatus compares the received information with registered information to determine whether the authentication succeeds or fails and returns a result of the determination.

PRIOR ART LITERATURE

Non-Patent Literature

Non-patent literature 1: DesigNET, "Entry-level LDAP/OpenLDAP directory service introduction/operation guidebook," May 5, 2012, SHUWA SYSTEM CO., LTD, pp. 148-150

Non-patent literature 2: Nat Sakimura, John Bradley, Michael B. Jones, Breno de Medeiros, Chuck Mortimore, "OpenID Connect Core 1.0-draft 17," [online], [Searched on Nov. 28, 2015], Internet <http://openid.net/specs/openid-connect-core-1_0.html>

SUMMARY OF THE INVENTION

Problems to be Solved by the Invention

The password authentication method is widely used but has a security problem (such as spoofing in password-list-based attack). To avoid the problem, a plurality of safer authentication methods are available. In a case where a client/server authentication system is newly developed, an authentication method safer than the password-based method can be relatively readily introduced.

In a case where an authentication system has already been operated by using the password authentication, however, introduction of an authentication method other than the password authentication method requires changes in the settings of an existing communication server apparatus and client apparatus, which makes the introduction difficult. The problem described above is not limited to the case where the password authentication method has been introduced to an authentication system and another authentication method is to be introduced to the authentication system. The problem described above is common to cases where an authentication system has started operating by using any of the existing authentication methods and another authentication method is to be introduced to the authentication system.

An object of the present invention is to introduce a new authentication method with no change in the settings of an existing communication server apparatus and client apparatus.

Means to Solve the Problem

A first client apparatus uses first input authentication information having a data content compliant with a first authentication method as first authentication target information in a data format compliant with the first authentication method and transmits information corresponding to the first authentication target information to a communication server apparatus.

A second client apparatus converts second input authentication information having a "data content" compliant with a second authentication method different from the first authentication method into second authentication target information in a "data format" compliant with the first authentication method and transmits information corresponding to the second authentication target information to the communication server apparatus.

A server apparatus receives information corresponding to authentication target information that is the first authentication target information or the second authentication target information from the communication server apparatus. The server apparatus is capable of carrying out both a first process of providing a first authentication server apparatus that carries out an authentication process compliant with the first authentication method with first information corresponding to the authentication target information and a second process of providing a second authentication server apparatus that carries out an authentication process compliant with the second authentication method with second information corresponding to the authentication target information. The server apparatus transmits authentication result information based on at least one of a result of the authentication performed by the first authentication server apparatus based on the first information and a result of the authentication performed by the second authentication server apparatus based on the second information to the communication server apparatus.

Effects of the Invention

The present invention allows introduction of a new authentication method with no change in the settings of an existing communication server apparatus and client apparatus.

BRIEF DESCRIPTION OF THE DRAWINGS

FIGS. 6A and 6B are each a block diagram showing the data configuration of authentication target information, and FIG. 6C is a conceptual diagram showing a relation table that identifies an authentication method;

DETAILED DESCRIPTION OF THE EMBODIMENTS

Figure 1:
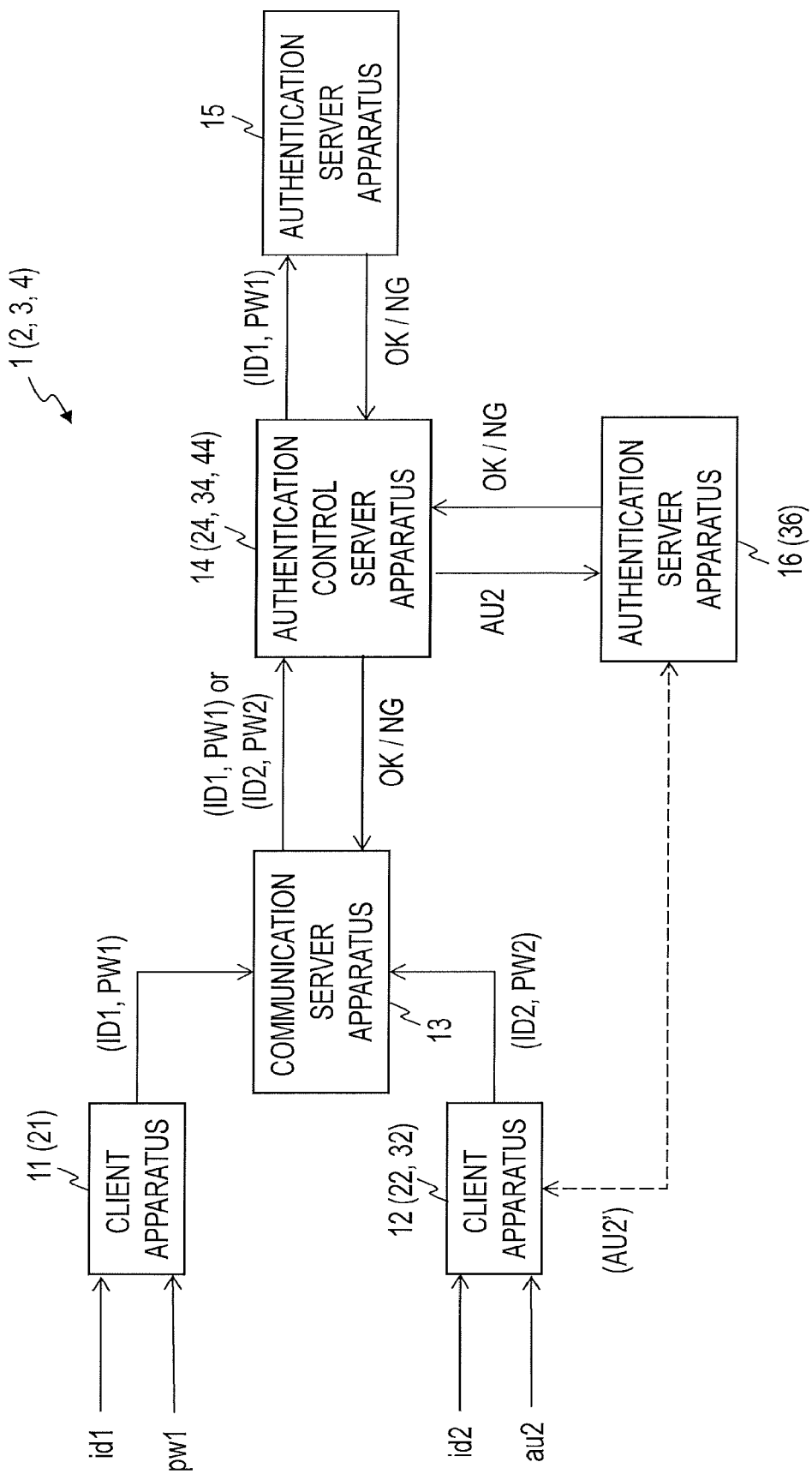
FIG. 1 is a block diagram showing an authentication control system according to an embodiment.

Embodiments of the present invention will be described below.

[Overview]

An overview will first be described. Assume a situation in which an existing authentication system employs a first authentication method, and a second authentication method different from the first authentication method is to be introduced to the authentication system. A first client apparatus, a communication server apparatus, and a first authentication server apparatus are apparatus that form the existing authentication system that employs the first authentication method. A second client apparatus and a second authentication server apparatus are apparatuses corresponding to the second authentication method, which will be newly introduced. The first authentication method is, for example, a password authentication method, and the second authentication method is, for example, an authentication method other than the password authentication method (such as authentication method using public key cryptography (such as electronic signature technology, that is, digital signature technology), authentication method using biometric authentication, and authentication method using information unique to physical device). The examples of the first and second authentication methods are not intended to limit the present invention, and the first authentication method may be an authentication method other than the password authentication method.

The client apparatus, which attempts to access the communication server apparatus, uses first input authentication information having a data content compliant with the first authentication method to form first authentication target information in a data form (format) compliant with the first authentication method and transmits information corresponding to the first authentication target information to the communication server apparatus. The first client apparatus is an apparatus corresponding to the existing first authentication method and therefore capable of the process described above. The communication server apparatus is an apparatus corresponding to the first authentication method and therefore capable of accepting the information corresponding to the first authentication target information in the data form compliant with the first authentication method. That is, the communication server apparatus can handle the first authentication target information in the data form compliant with the first authentication method. The "data form compliant with the first authentication method" in the case where the "first authentication method" is the password authentication method is, for example, a data form comprising an "identifier area" and a "password area." In this case, the "identifier area" of the "first authentication target information" stores a "first identifier," and the "password area" of the "first authentication target information" stores "first authentication information" corresponding to the password (password or function value of password, for example). The "information corresponding to first authentication target information" may be the "first authentication target information" itself or a function value of the "first authentication target information" (cryptogram or hash value of "first authentication target information," for example).

The second client apparatus, which attempts to access the communication server apparatus, converts second input authentication information having a data content compliant with the second authentication method different from the first authentication method into second authentication target information in the data form compliant with the first authentication method and transmits information corresponding to the second authentication target information to the communication server apparatus. The data content of the second authentication target information complies with the second authentication method, but the data form of the second authentication target information complies with the first authentication method. The communication server apparatus is an apparatus corresponding to the first authentication method and can accept information having a data content compliant with the second authentication method but having the data form compliant with the first authentication method. The communication server apparatus can therefore accept the information corresponding to the second authentication target information. That is, the communication server apparatus can handle the second authentication target information in the data form compliant with the first authentication method. The "data form compliant with the second authentication method" in the case where the "first authentication method" is the password authentication method is, for example, a data form comprising the "identifier area" and the "password area." In this case, the "identifier area" of the "second authentication target information" stores a "second identifier," and the "password area" of the "second authentication target information" stores "second authentication information" corresponding to authentication information other than the password (electronic signature, biometric authentication information, physical device information, or function value thereof, for example). The "information corresponding to second authentication target information" may be the "second authentication target information" itself or a function value of the "second authentication target information" (cryptogram or hash value of "second authentication target information," for example).

The communication server apparatus, when it receives the information corresponding to the first authentication target information, transmits the information corresponding to the first authentication target information as information corresponding to authentication target information to an authentication control server apparatus (server apparatus). The communication server apparatus, when it receives the information corresponding to the second authentication target information, transmits the information corresponding to the second authentication target information as information corresponding to authentication target information to the authentication control server apparatus.

The authentication control server apparatus is capable of receiving both the information corresponding to the first authentication target information and the information corresponding to the second authentication target information and receives information corresponding to authentication target information that is the first authentication target information or the second authentication target information from the communication server apparatus. The authentication control server apparatus can handle authentication target information in the data form compliant with the first authentication method. That is, the authentication control server apparatus can handle both the first authentication target information and the second authentication target information. The authentication control server apparatus is capable of carrying out both a first process of providing the first authentication server apparatus, which carries out an authentication process compliant with the first authentication method, with first information corresponding to the authentication target information and a second process of providing the second authentication server apparatus, which carries out an authentication process compliant with the second authentication method, with second information corresponding to the authentication target information. For example, the second process may first be carried out, and when a result of the authentication of the second process performned by the second authentication server apparatus is unsuccessful, the first process may be carried out (Example 1). Conversely, the first process may first be carried out, and when a result of the authentication of the first process performed by the first authentication server apparatus is unsuccessful, the second process may be carried out (Example 2). Still instead, the first process or the second process to be carried out may be chosen in accordance with a result of determination of the data content of the authentication target information (Example 3). In the case of Example 3, the authentication control server apparatus determines at least one of whether or not the data content of the authentication target information complies with the first authentication method and whether or not the data content of the authentication target information complies with the second authentication method. For example, the authentication target information contains determination information for determination of the authentication method, and the authentication control server apparatus uses at least the determination information to determine at least one of whether or not the data content of the authentication target information complies with the first authentication method and whether or not the data content of the authentication target information complies with the second authentication method different from the first authentication method. Instead, the authentication control server apparatus may store a relation table that identifies an authentication method corresponding to the determination information and use the determination information and the relation table to determine at least one of whether or not the data content of the authentication target information complies with the first authentication method and whether or not the data content of the authentication target information complies with the second authentication method different from the first authentication method. In this process, in a case where the data content of the authentication target information complies with the first authentication method or does not comply with the second authentication method, the authentication control server apparatus transmits (provides) the first information corresponding to the authentication target information to the first authentication server apparatus, which carries out an authentication process compliant with the first authentication method. On the other hand, in a case where the data content of the authentication target information complies with the second authentication method or does not comply with the first authentication method, the authentication control server apparatus transmits (provides) the second information corresponding to the authentication target information to the second authentication server apparatus, which carries out an authentication process compliant with the second authentication method. For example, in the case where the "authentication target information" comprises the "identifier area" and the "password area," the "first information" corresponds to the "first identifier" stored in the "identifier area" and "information comprising the first authentication information" stored in the "password area." In this case, the "first authentication information" corresponds to the password, and the "information comprising the first authentication information" may be the "first authentication information" itself or may be formed of the "first authentication information" and another piece of information (header or fixed information, for example). The "second information" corresponds to the "second identifier" stored in the "identifier area" and "information comprising the second authentication information" stored in the "password area." The "second authentication information" corresponds to authentication information other than the password, and the "information comprising the second authentication information" may be the "second authentication information" itself or may be formed of the "second authentication information" and another piece of information (header or fixed information, for example).

When the first information is transmitted to the first authentication server apparatus, the first authentication server apparatus carries out the authentication process on the basis of the first information and transmits a result of the authentication (result of determination of whether authentication has succeeded or failed) to the authentication control server apparatus. When the second information is transmitted to the second authentication server apparatus, the second authentication server apparatus carries out the authentication process on the basis of the second information and transmits a result of the authentication to the authentication control server apparatus.

The authentication control server apparatus, when it receives the result of the authentication performed by the first authentication server apparatus on the basis of the first information or the result of the authentication performed by the second authentication server apparatus on the basis of the second information, transmits authentication result information based on the received authentication result to the communication server apparatus (source from which information corresponding to authentication target information is transmitted). The authentication result information is information representing whether the authentication has succeeded or failed.

The communication server apparatus receives the authentication result information, and in a case where the authentication result information shows that "the authentication has succeeded," the communication server apparatus allows the first client apparatus having transmitted the "information corresponding to the first authentication target information" or the second client apparatus having transmitted the "information corresponding to the second authentication target information" to access the communication server apparatus. On the other hand, in a case where the authentication result information shows that "the authentication has failed," the communication server apparatus rejects the first client apparatus or the second client apparatus to access the communication server apparatus.

As described above, since the second client apparatus converts the second input authentication information having a data content compliant with the second authentication method into second authentication target information having the data form compliant with the first authentication method and transmits the second authentication target information, the setting of the communication server apparatus corresponding to the existing first authentication method does not need to be changed. The first client apparatus can keep using the existing first authentication method and does not need to change the setting thereof to use the second authentication method. The new second authentication method can therefore be introduced with no change in the setting of the existing communication server apparatus or the first client apparatus. As a result, a new authentication method can be readily introduced. Further, the second client apparatus is allowed to undergo the authentication process on the basis of a data content compliant with the second authentication method. In a case where the second authentication method is superior to the first authentication method in terms of performance (safety, for example), the second client apparatus can use the second authentication method having higher performance.

Before the second client apparatus transmits the second authentication target information to the communication server apparatus, the second client apparatus may carry out a pre-authentication process directly along with the second authentication server apparatus. In this case, the second client apparatus transmits pre-authentication information for the pre-authentication (authentication information on authentication method using PIN code and public key cryptography, electronic signature, biometric authentication information, physical device information, or function value thereof, for example) and the second identifier to the second authentication server apparatus. The second authentication server apparatus uses the transmitted authentication information to perform the pre-authentication and stores information representing a result of the pre-authentication (information corresponding to successful or unsuccessful authentication result, for example) and the second identifier related to the information. The second authentication server apparatus transmits the second identifier to the second client apparatus. The "second authentication target information" in this case comprises the "second identifier" corresponding to the pre-authentication process performed by the second authentication server apparatus, and the "second information" corresponds to information comprising information corresponding to the "second identifier." The "second information" may be the "second identifier" itself, a function value of the "second identifier," information comprising "second information" or a function value thereof, or a function value of the information comprising "second information" or a function value thereof. The second authentication server apparatus identifies the pre-authentication result related to the "second identifier" on the basis of the "second information" and sets the pre-authentication result to be a re-authentication result (result of re-authentication performed by second authentication server apparatus by using information corresponding to second identifier). The second authentication server apparatus transmits the "re-authentication result" as a "result of authentication performed by the second authentication server apparatus" to the authentication control server apparatus (pre-authentication method 1). The present invention can thus be applied even to a case where the data content of the second authentication target information compliant with the second authentication method has a large amount of data and cannot therefore be directly changed to a data content having the data form compliant with the first authentication method.

The second client apparatus may instead transmit the pre-authentication information for the pre-authentication and a third identifier to the second authentication server apparatus. In this case, the second authentication server apparatus uses the transmitted pre-authentication information and third identifier to perform the pre-authentication and stores information representing a result of the pre-authentication (information corresponding to successful or unsuccessful authentication result, for example) and a second identifier (onetime token) that is newly generated first onetime information (onetime password, for example) and related to the information. The second authentication server apparatus transmits the second identifier to the second client apparatus. The other points are the same as those in the pre-authentication method 1 (pre-authentication method 2). The pre-authentication method 2 can prevent a man-in-the-middle attack, in which a second identifier corresponding to a pre-authentication process in the past leaks out to a third party and the third party uses the acquired second identifier to achieve a successful re-authentication result, or what is called "spoofing."

In the pre-authentication method 1 or 2, the second client apparatus may generate new second onetime information (onetime random information, for example) for each pre-authentication and transmit pre-authentication information comprising at least authentication information corresponding to the second onetime information (for example, authentication information on authentication method using second onetime information and public key cryptography, electronic signature to second onetime information, and the like) and the second onetime information to the second authentication server apparatus. In this case, the second authentication server apparatus stores onetime information in the past (second onetime information contained in pre-authentication information transmitted in past pre-authentication), and when the second onetime information corresponds to the onetime information in the past (for example, a case where the past onetime information coincides with the second onetime information or a case where a function value of each of the past onetime information and the second onetime information has a predetermined value), the authentication fails. The second authentication server apparatus further carries out another authentication process using the pre-authentication information and transmits a second identifier corresponding to the pre-authenticating process using the pre-authentication information described above to the second client apparatus. In the modification of the pre-authentication method 1, the second identifier is transmitted from the second client apparatus, and in the modification of the pre-authentication method 2, the second identifier is first onetime information newly generated by the second authentication server apparatus (pre-authentication method 3). The modifications can prevent a man-in-the-middle attack, in which pre-authentication information used in a past pre-authentication process leaks out to a third party and the third party uses the acquired pre-authentication information to carry out the pre-authentication process to achieve successful authentication.

Further, in the pre-authentication method 3, the second authentication server apparatus may also issue unsuccessful authentication result in a case where the pre-authentication information transmitted to the second authentication server apparatus is produced earlier than a specified point of time. The pre-authentication information in this case is, for example, information comprising at least authentication information corresponding to the second onetime information and information representing the current point of time (for example, authentication information on authentication method using second onetime information, information representing current point of time, and public key cryptography, electronic signature to second onetime information and information representing current point of time, and the like), the second onetime information, and the information representing the current point of time. The thus configured pre-authentication information can prevent a man-in-the-middle attack after past onetime information stored in the second authentication server apparatus is deleted. In this case, the second authentication server apparatus does not need to save onetime information earlier than the "specified point of time," whereby the storage area where the second authentication server apparatus saves past onetime information can be reduced, and the cost required to manage past onetime information can be lowered.

Further, the "second identifier" may be information based on new second onetime information generated whenever the second client apparatus performs the pre-authentication. For example, the second onetime information may be directly used as the second identifier, or a function value of the second onetime information may be used as the second identifier. In this case, the second client apparatus does not need to newly generate the first onetime information, but a man-in-the-middle attack using a second identifier corresponding to a past pre-authentication process can be avoided.

In addition to the above, in the case where the data content of the authentication target information complies with the second authentication method, the authentication control server apparatus may further transmit the first information to the first authentication server apparatus and receive a result of the authentication performed by the first authentication server apparatus. In this case, when the data content of the authentication target information complies with the first authentication method or does not comply with the second authentication method, the authentication control server apparatus transmits authentication result information representing a result of the authentication performed by the first authentication server apparatus on the basis of the first information to the communication server apparatus. On the other hand, when the content of the authentication target information complies with the second authentication method, the authentication control server apparatus transmits "authentication result information" based on both a result of the authentication performed by the first authentication server apparatus on the basis of the first information and a result of the authentication performed by the second authentication server apparatus on the basis of the second information to the communication server apparatus. In a case where both the result of the authentication performed by the first authentication server apparatus and the result of the authentication performed by the second authentication server apparatus are "successful," the "authentication result information" may represent "successful," otherwise the "authentication result information" may represent "unsuccessful." Instead, in a case where the result of the authentication performed by the first authentication server apparatus or the result of the authentication performed by the second authentication server apparatus is "successful," the "authentication result information" may represent "successful," otherwise the "authentication result information" may represent "unsuccessful." It is, however, noted that the former is desirable in a case where the second authentication method is introduced for improvement in safety. Further, the former is desirable in a case where the authentication performed by the first authentication server apparatus is essential from a viewpoint of the system configuration, a case where the authentication performed by the first authentication server apparatus is required by another system and the other system cannot be changed, and other cases. At least one of the first onetime information and the second onetime information or information based on at least one of the first onetime information and the second onetime information (function value, for example) may be used as the first input authentication information described above (password, for example). Each of the first onetime information and the second onetime information is information stored in the second authentication server apparatus. Therefore, to allow the first authentication server apparatus to carry out the authentication process, at least one of the first onetime information and the second onetime information stored in the second authentication server apparatus or information based on at least one of the first onetime information and the second onetime information needs to be acquired or allowed to be referred to.

The authentication control server apparatus may comprise at least one of the first authentication server apparatus and the second authentication server apparatus. In a case where the authentication control server apparatus comprises the first authentication server apparatus, the authentication control server apparatus does not need to transmit the first information but only needs to give the first information to the first authentication server apparatus. In a case where the authentication control server apparatus comprises the second authentication server apparatus, the authentication control server apparatus does not need to transmit the second information but only needs to give the second information to the second authentication server apparatus.

First Embodiment

A first embodiment will be described with reference to the drawings.

<Configuration>

An authentication control system 1 according to the present embodiment comprises client apparatus 11 and 12, a communication server apparatus 13, an authentication control server apparatus 14 (server apparatus), and authentication server apparatus 15 and 16, as shown in FIG. 1. The client apparatus 11, 12 and the communication server apparatus 13 can communicate with each other via a network, and the authentication control server apparatus 14 can communicate with the communication server apparatus 13 and the authentication server apparatus 15 and 16 via a network. The client apparatus 11 and 12 provided in the authentication control system 1 according to the present embodiment are each formed of one client apparatus but may instead be each formed of a plurality of client apparatus. Similarly, the communication server apparatus 13, the authentication control server apparatus 14, and the authentication server apparatus 15 and 16 may each be formed of a plurality of apparatus.

Figure 2A:
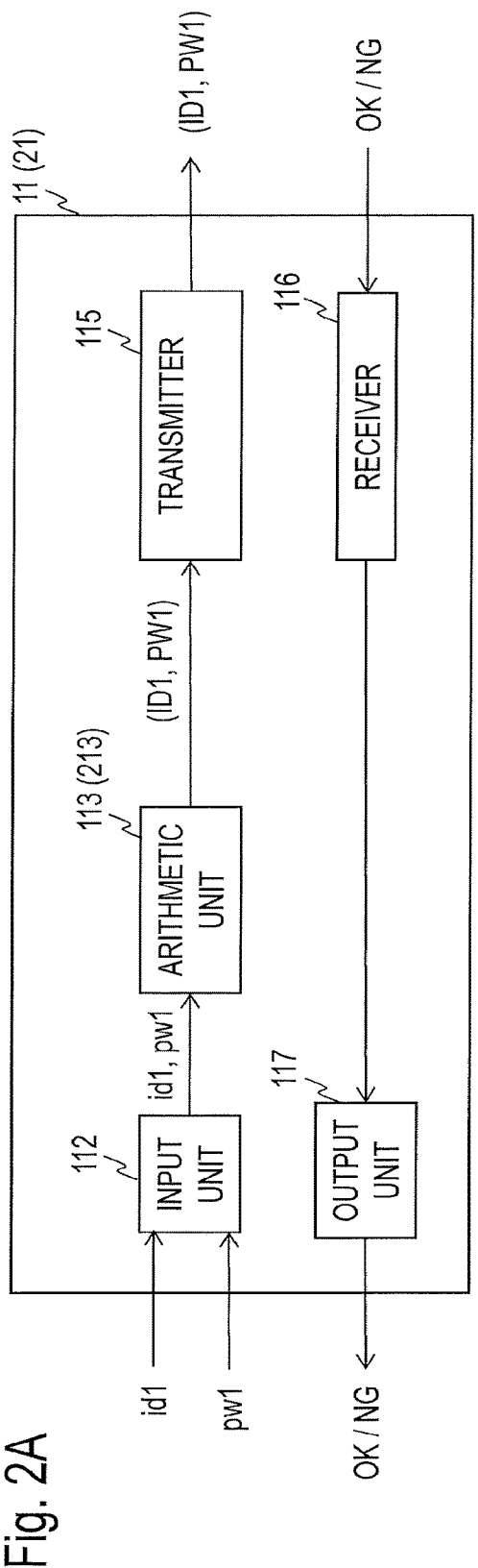
FIGS. 2A and 2B are each a block diagram showing a client apparatus according to the embodiment.
Figure 2B:
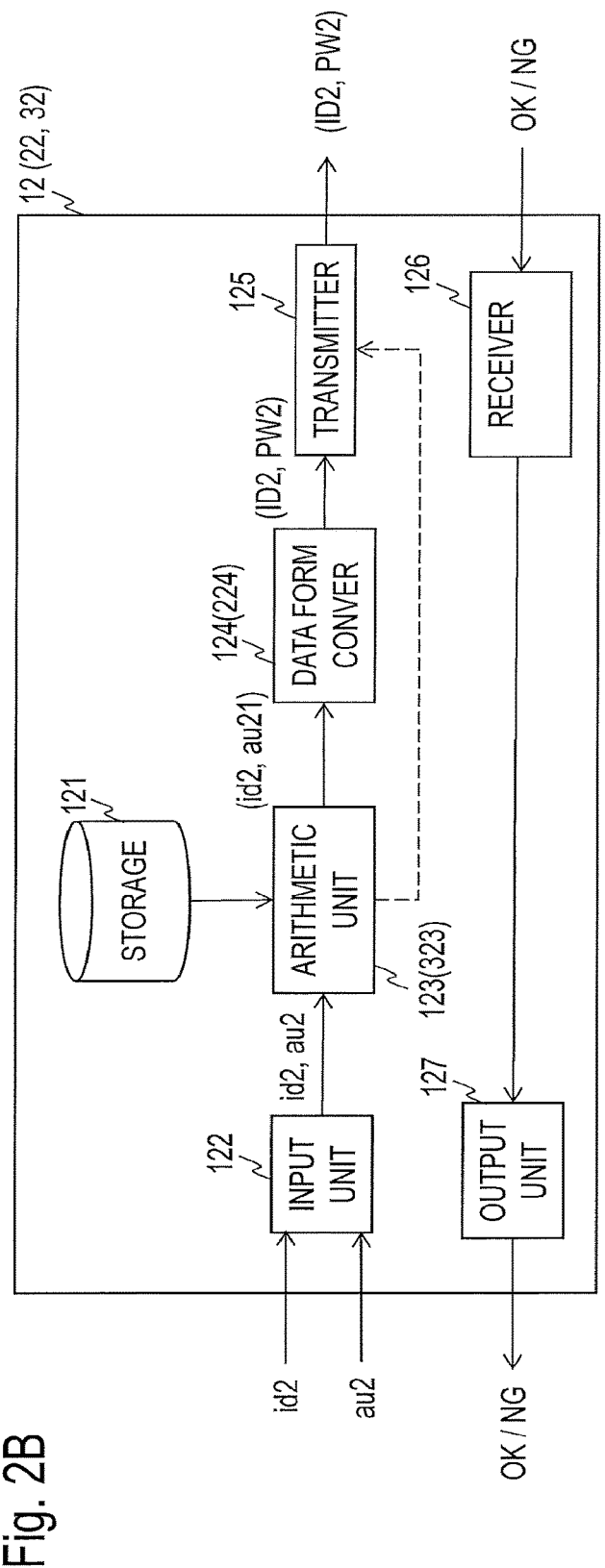

The client apparatus 11 according to the present embodiment comprises an input unit 112, an arithmetic unit 113, a transmitter 115, a receiver 116, and an output unit 117, as shown in FIG. 2A. The client apparatus 12 according to the present embodiment comprises storage 121, an input unit 122, an arithmetic unit 123, a data form converter 124, a transmitter 125, a receiver 126, and an output unit 127, as shown in FIG. 2B. The client apparatus 11 and 12 uses a web browser or any other tool to communicate with the communication server apparatus 13, which is, for example, a web server apparatus, over the network.

Figure 3:
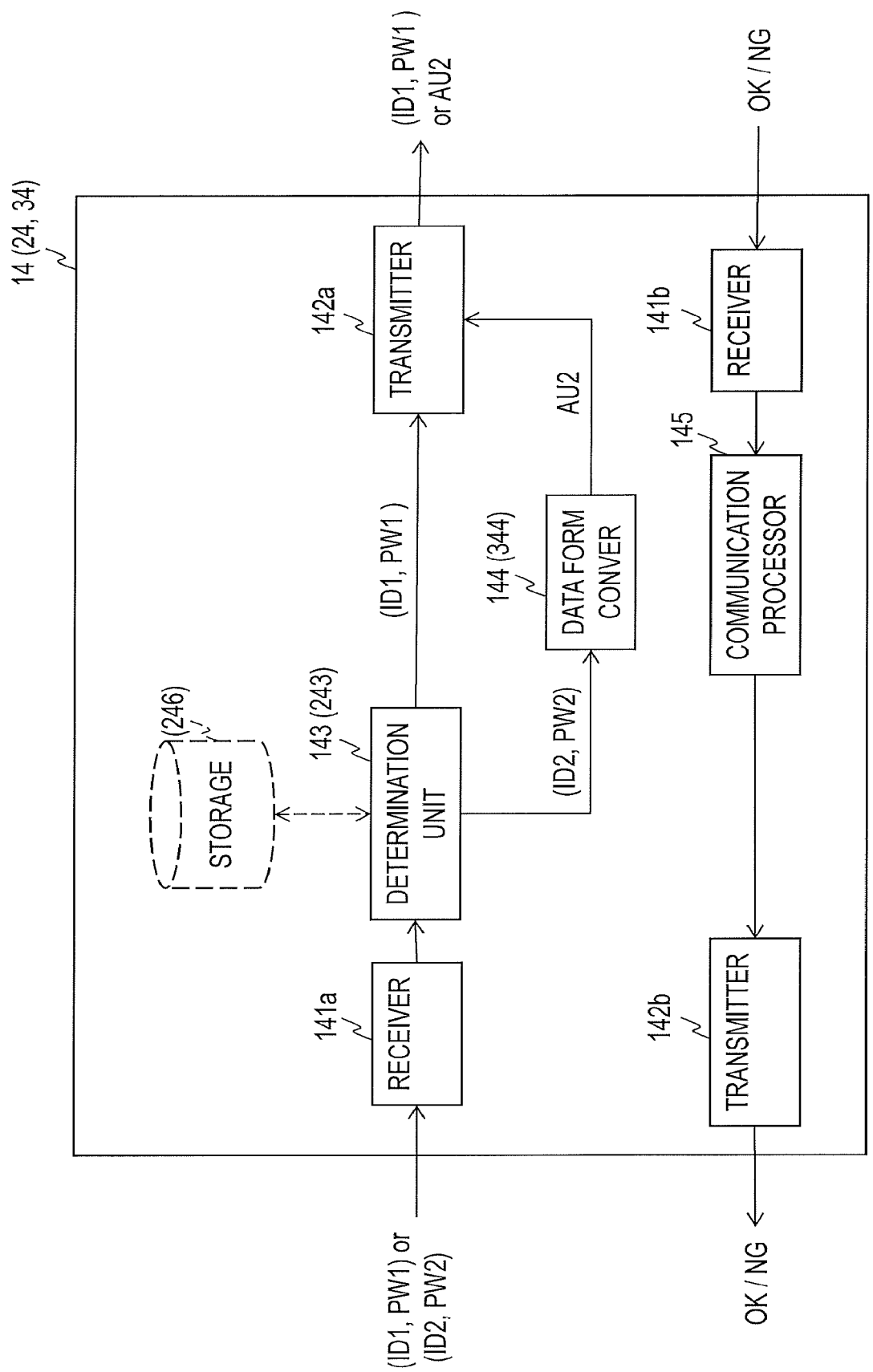
FIG. 3 is a block diagram showing an authentication control server apparatus (server apparatus) according to the embodiment.

The authentication control server apparatus 14 according to the present embodiment comprises receivers 141a and 141b, a transmitter 142a (provision unit), a transmitter 142b, a determination unit 143, a data form converter 144, and a communication processor 145, as shown in FIG. 3.

Figure 4A:
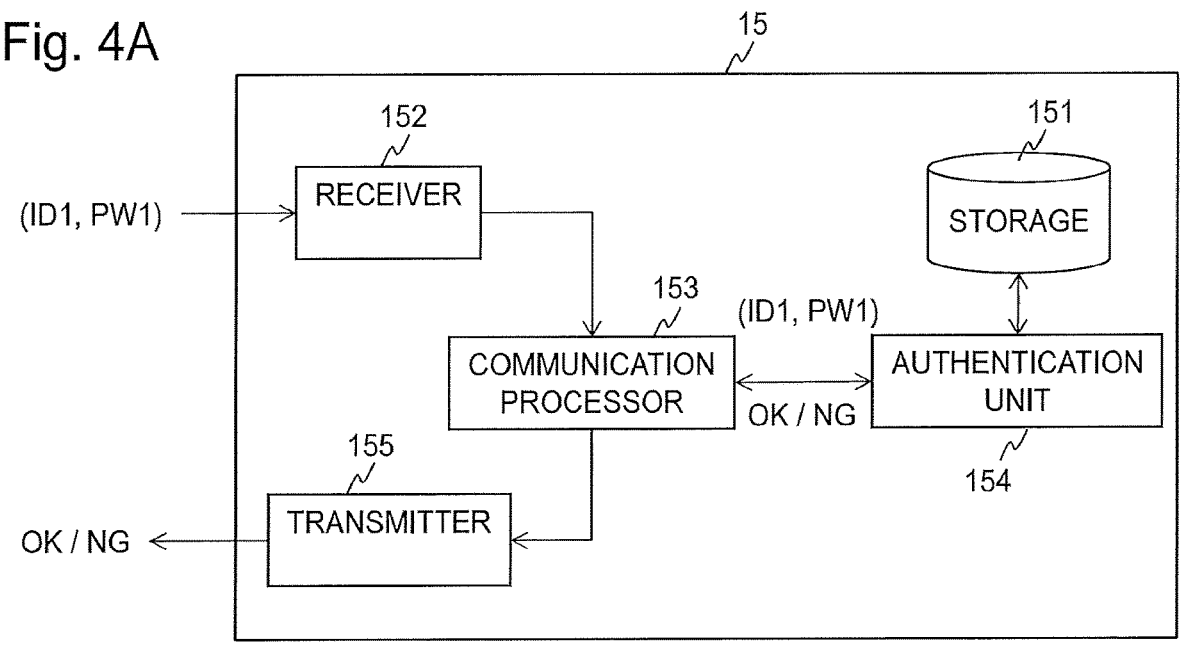
FIGS. 4A and 4B are each a block diagram showing an authentication server apparatus.
Figure 4B:
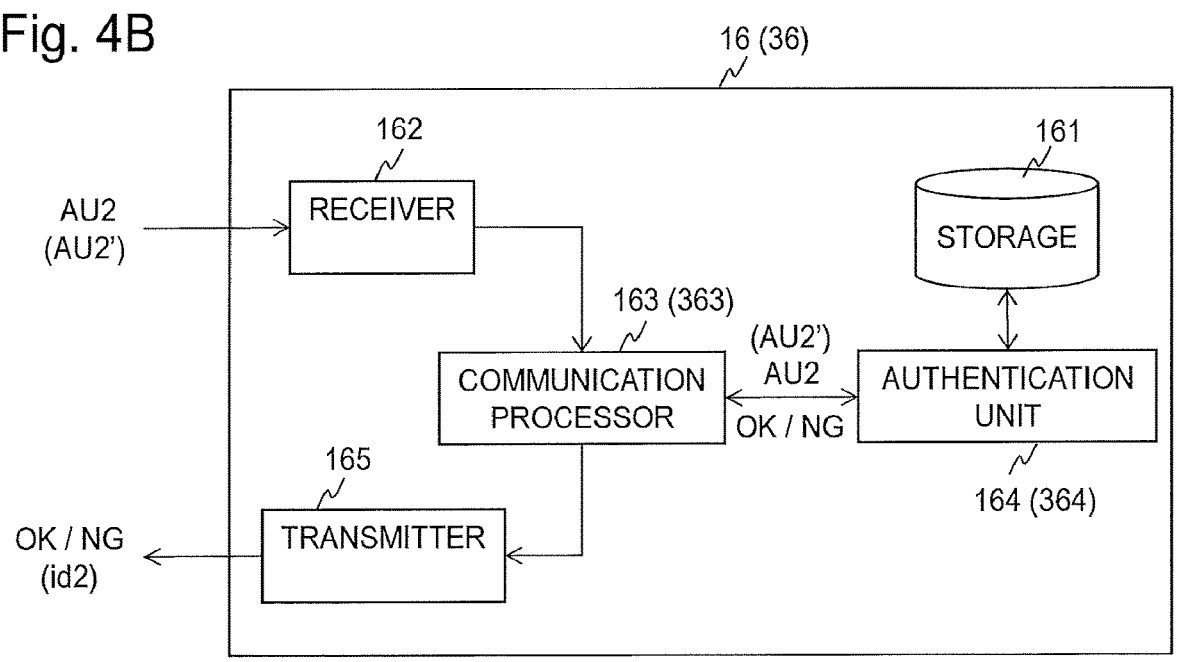

The authentication server apparatus 15 according to the present embodiment comprises storage 151, a receiver 152, a communication processor 153, an authentication unit 154, and a transmitter 155, as shown in FIG. 4A. The authentication server apparatus 16 according to the present embodiment comprises storage 161, a receiver 162, a communication processor 163, an authentication unit 164, and a transmitter 165, as shown in FIG. 4B.

<Processes>

A description will be made of a case where an existing authentication system employs the first authentication method and the second authentication method different from the first authentication method is introduced to the authentication system. The client apparatus 11 (first client apparatus), the communication server apparatus 13, and the authentication server apparatus 15 (first authentication server apparatus) are apparatus that form the existing authentication system that employs the first authentication method. The client apparatus 12 (second client apparatus) and the authentication server apparatus 16 (second authentication server apparatus) are apparatus corresponding to the second authentication method to be newly introduced. In the present embodiment, the description will be made with reference to the case where the first authentication method is the password authentication method and the second authentication method is an authentication method other than the password authentication method (authentication method using public key cryptography, authentication method using PIN code and public key cryptography, authentication method using biometric authentication, and authentication method using information unique to physical device).

<Pre-Process>

Authentication generation information for generation of second input authentication information having a data content compliant with the second authentication method is stored in the storage 121 of the client apparatus 12 (FIG. 2B). For example, in a case where the second authentication method is an authentication method using a public key cryptography, the authentication generation information is a secret key compliant with a public key encryption method. In a case where the second authentication method is an authentication method using biometric authentication, the authentication generation information is information necessary for extraction of a characteristic quantity from the biometric authentication. In a case where the second authentication method is an authentication method using information unique to a physical device, the authentication generation information is information unique to a physical device that forms the client apparatus 12.

First authentication process information for determination of whether the authentication succeeds or fails in accordance with the first authentication method is stored in the storage 151 of the authentication server apparatus 15 (FIG. 4A). For example, a relation table (list) having a plurality of sets of an identifier idn related to a hash value H (pwn) of a password pwn corresponding to the identifier idn is stored as the first authentication process information in the storage 151.

Second authentication process information for determination of whether the authentication succeeds or fails in accordance with the second authentication method is stored in the storage 161 of the authentication server apparatus 16 (FIG. 4B). For example, in the case where the second authentication method is an authentication method using a public key cryptography, the second authentication process information is a relation table that relates an identifier to a public key compliant with a public key encryption method corresponding to the identifier. In the case where the second authentication method is an authentication method using biometric authentication, the second authentication process information is a relation table that relates an identifier to information corresponding to a characteristic quantity of the body of a user corresponding to the identifier (hash value, for example). In the case where the second authentication method is an authentication method using information unique to a physical device, the second authentication process information is an identifier and a hash value of the information unique to the physical device corresponding to the identifier.

<Process of Authenticating Client Apparatus 11>

A description will be made of the process of authenticating the client apparatus 11 that attempts to access the communication server apparatus 13. An identifier id1 (first identifier) and a password pw1 (first input authentication information having data content compliant with first authentication method) are first inputted to the input unit 112 of the client apparatus 11 (FIG. 2A) (step S112-1). The identifier id1 and the password pw1 are sent to the arithmetic unit 113, and the arithmetic unit 113 generates first authentication target information (ID1, PW1) formed of the identifier id1 and the password pw1 in the data form compliant with the first authentication method and outputs the first authentication target information. For example, the arithmetic unit 113 generates the first authentication target information (ID1, PW1) having the identifier id1 stored in an identifier area ID1, information sc1 representing the first authentication method (determination information for determination of authentication method) stored in a header area H1 of a password area PW1, and the password pw1 stored in a body area B1 and outputs the first authentication target information (step S113-1). The first authentication target information (ID1, PW1) is sent to the transmitter 115, and the transmitter 115 transmits information corresponding to the first authentication target information (ID1, PW1) to the communication server apparatus 13. The information corresponding to the first authentication target information (ID1, PW1) may, for example, be the first authentication target information (ID1, PW1) itself or a cryptogram (cryptogram based, for example, on secure sockets layer (SSL)) of the first authentication target information (ID1, PW1) (step S115-1).

The communication server apparatus 13 to which the information corresponding to the first authentication target information (ID1, PW1) has been transmitted transmits the information to the authentication control server apparatus 14 (step S13-1).

The information corresponding to the first authentication target information (ID1, PW1) is received by the receiver 141*a* of the authentication control server apparatus 14 (FIG. 3). The receiver 141*a* can handle the first authentication target information (ID1, PW1) in the data form compliant with the first authentication method. The receiver 141*a* sends the first authentication target information (ID1, PW1) obtained from the information corresponding to the first authentication target information (ID1, PW1) to the determination unit 143. For example, in the case where the information corresponding to the first authentication target information (ID1, PW1) is the first authentication target information (ID1, PW1) itself, the receiver 141*a* sends the first authentication target information (ID1, PW1) to the determination unit 143. In the case where the information corresponding to the first authentication target information (ID1, PW1) is a cryptogram, the receiver 141*a* sends the first authentication target information (ID1, PW1) obtained by decoding of the cryptogram to the determination unit 143 (step S141*a*-1).

Figure 5A:
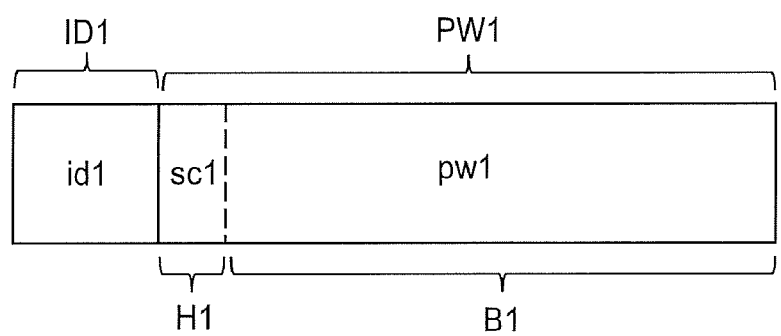
FIGS. 5A and 5B are each a block diagram showing the data configuration of authentication target information.

The determination unit 143 determines whether the data content of the first authentication target information (ID1, PW1) complies with the first authentication method or the second authentication method. The determination unit 143 according to the present embodiment performs the determination by using the information stored in the header area H1 of the password area PW1. For example, when the information stored in the header area H1 is sc1, the determination unit 143 determines that the data content complies with the first authentication method, whereas when the information stored in the header area H1 is sc2, the determination unit 143 determines that the data content complies with the second authentication method (step S143-1). Since sc1 is stored in the header area H1 of the password area PW1, as described above (FIG. 5A), the determination unit 143 determines that the data content of the first authentication target information (ID1, PW1) complies with the first authentication method. In this case, the first authentication target information (ID1, PW1) is sent to the transmitter 142a, and the transmitter 142a transmits first information corresponding to the first authentication target information (ID1, PW1) to the authentication server apparatus 15, which carries out an authentication process compliant with the first authentication method (first process). The first information may, for example, be the first authentication target information (ID1, PW1) itself, a cryptogram of the first authentication target information (ID1, PW1), or a hash value of the first authentication target information (ID1, PW1) or a cryptogram of the hash value (step S142a-1).

The first information is received by the receiver 152 of the authentication server apparatus 15 (FIG. 4A), and the information corresponding to the first authentication target information (ID1, PW1) is sent to the communication processor 153 (step S152-1). The communication processor 153 sends the information corresponding to the first authentication target infonation (ID1, PW1) to the authentication unit 154 (step S153-1). The authentication unit 154 uses the information and the first authentication process information stored in the storage 151 to carry out the process of authenticating the first authentication target information (ID1, PW1). For example, in the case where the relation table having a plurality of sets of an identifier related to a hash value of the password corresponding to the identifier is stored as the first authentication process information in the storage 151, the authentication unit 154 extracts a hash value corresponding to ID1 (for example, hash value corresponding to identifier id1 stored in identifier area ID1) from the relation table and determines whether the extracted hash value coincides with the hash value of PW1 newly calculated from PW1 in the first authentication target information (hash value of password pw1 stored in password area PW1). When they coincide with each other, the authentication unit 154 sends an authentication result (OK) representing that the authentication has succeeded to the communication processor 153, otherwise the authentication unit 154 sends an authentication result (NG) representing that the authentication has failed to the communication processor 153. The authentication unit 154 sends the authentication result (NG) representing that the authentication has failed to the communication processor 153 also in a case where the hash value corresponding to ID1 is not stored in the storage 151 (step S154-1). The communication processor 153 sends the authentication result (OK/NG) to the transmitter 155, and the transmitter 155 transmits the authentication result (OK/NG) to the authentication control server apparatus 14 (step S155-1).

The authentication result (OK/NG) (result of authentication performed by first authentication server apparatus on the basis of first information) is received by the receiver 141b of the authentication control server apparatus 14 (FIG. 3) and sent to the communication processor 145 (step S141b-1). The communication processor 145 sends the authentication result (OK/NG) to the transmitter 142b, and the transmitter 142b transmits the authentication result (OK/NG) (authentication result information) to the communication server apparatus 13 (source from which information corresponding to authentication target information has been transmitted) (step S145-1). The communication server apparatus 13 uses the authentication result (OK/NG) to carry out the following process. For example, in the case where the authentication result is successful (OK), the communication server apparatus 13 carries out the process of allowing the client apparatus 11 to log in. In the case where the authentication result is unsuccessful (NG), the communication server apparatus 13 sends error display information from the transmitter 142b to the client apparatus 11 and requests the client apparatus 11 to input a password again. In a case where the authentication result is successively unsuccessful (NG) multiple times determined in advance, the communication server apparatus 13 handles the access as an unauthorized log-in process and can lock the account of the client apparatus 11, prohibit the log-in process for a fixed period, or impose any other penalty (step S142b-1).

<Process of Authenticating Client Apparatus 12>

A description will be made of the process of authenticating the client apparatus 12 that attempts to access the communication server apparatus 13. An identifier id2 (second identifier) and authentication information au2 other than the password are first inputted to the input unit 122 of the client apparatus 12 (FIG. 2B). For example, in the case where the second authentication method is an authentication method using a public key cryptography, signature target information is au2. For example, in the case where the second authentication method is an authentication method using a PIN code and a public key cryptography, the PIN code is au2. For example, in the case where the second authentication method is an authentication method using biometric authentication, biometric information, such as a fingerprint image, a vein image, an iris image, a handwritten letter image, and voice information, is au2. In the case where the second authentication method is an authentication method using information unique to a physical device, information that specifies the physical device or any other piece of information may be au2, or a null value may be au2 (step S122-2). The identifier id2 and the authentication information au2 are sent to the arithmetic unit 123, and the arithmetic unit 123 uses the identifier id2 and the authentication information au2 as well as the authentication generation information stored in the storage 121 to set second authentication information au21 corresponding to the authentication information au2. For example, in the case where the second authentication method is an authentication method using a public key cryptography, the arithmetic unit 123 uses a secret key that is the authentication generation information to generate an electronic signature for the authentication information au2 and sets au2 and the electronic signature to be the second authentication information au21. In the case where the second authentication method is an authentication method using biometric authentication, the arithmetic unit 123 uses the authentication generation information to extract a characteristic quantity from the authentication information au2 and generates the second authentication information au21. In the case where the second authentication method is an authentication method using information unique to a physical device, the arithmetic unit 123 sets the authentication generation information that is information unique to the physical device identified by the authentication information au2 or authentication generation information that is the information unique to the physical device identified without use of the authentication information au2 to be the second authentication information au21. The identifier id2 and the second authentication information au21 (second input authentication information having data content compliant with second authentication method) are sent to the data form converter 124 (step S123-2).

Figure 5B:
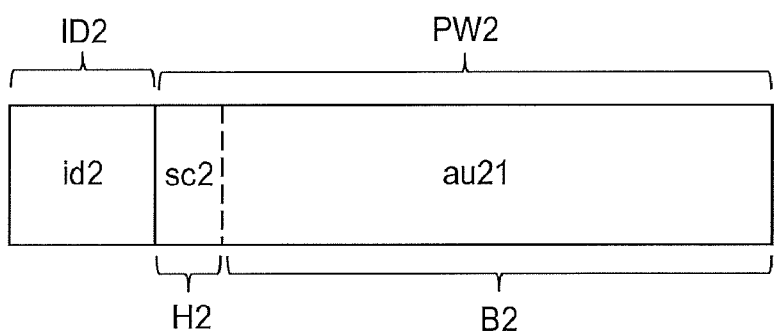

The data form converter 124 converts the identifier id2 and the second authentication information au21 into second authentication target information (TD2, PW2) in the data form compliant with the first authentication method different from the second authentication method (converts second input authentication information having data content compliant with second authentication method different from first authentication method into second authentication target information in data form compliant with first authentication method). The second authentication target information (ID2, PW2) in the present embodiment comprises an identifier area ID2, which stores the identifier id2, and a password area PW2, which stores the second authentication information au21. For example, the identifier id2 is stored in the identifier area ID2 of the second authentication target information (ID2, PW2), information sc2 (determination information for determination of authentication method) representing the second authentication method is stored in a header area H2 of the password area PW2, and fixed-length letter string information representing the second authentication information au21 is stored in a body area B2, as shown in FIG. 5B (step S124-2). The second authentication target information (ID2, PW2) is sent to the transmitter 125, and the transmitter 125 transmits information corresponding to the second authentication target information (ID2, PW2) to the communication server apparatus 13. The information corresponding to the second authentication target information (ID2, PW2) may, for example, be the second authentication target information (ID2, PW2) itself or a cryptogram of the second authentication target information (ID2, PW2) (step S125-2).

The communication server apparatus 13 to which the information corresponding to the second authentication target information (ID2, PW2) has been transmitted transmits the information to the authentication control server apparatus 14 (step S13-2).

The information corresponding to the second authentication target information (TD2, PW2) is received by the receiver 141a of the authentication control server apparatus 14 (FIG. 3). The receiver 141a can handle the second authentication target information (ID2, PW2) in the data form compliant with the first authentication method. The receiver 141a sends the second authentication target information (ID2, PW2) obtained from the information corresponding to the second authentication target information (ID2, PW2) to the determination unit 143. For example, in the case where the information corresponding to the second authentication target information (ID2, PW2) is the second authentication target information (ID2, PW2) itself, the receiver 141a sends the second authentication target information (ID2, PW2) to the determination unit 143. In the case where the information corresponding to the second authentication target information (ID2, PW2) is a cryptogram, the receiver 141a sends the second authentication target information (TD2, PW2) obtained by decoding of the cryptogram to the determination unit 143 (step S141a-2).

The determination unit 143 determines whether the data content of the second authentication target information (TD2, PW2) complies with the first authentication method or the second authentication method. The determination unit 143 according to the present embodiment performs the determination by using the information stored in the header area H2 of the password area PW2. For example, when the information stored in the header area H2 is sc1, the determination unit 143 determines that the data content complies with the first authentication method, whereas when the information stored in the header area H2 is sc2, the determination unit 143 determines that the data content complies with the second authentication method (step S143-2). Since sc2 is stored in the header area H2 of the password area PW2, as described above (FIG. 5B), the determination unit 143 determines that the data content of the second authentication target information (ID2, PW2) complies with the second authentication method. In this case, the second authentication target information (ID2, PW2) is inputted to the data form converter 144, and the data form converter 144 obtains and outputs information AU2 representing the content of the second authentication target information (ID2, PW2). The information AU2 is sent to the transmitter 142a, and the transmitter 142a transmits the second information corresponding to the information AU2 (second information corresponding to second authentication target information (ID2, PW2)) to the authentication server apparatus 16, which carries out an authentication process compliant with the second authentication method (second process). The information AU2 may, for example, be the second authentication target information (ID2, PW2) itself or a function value of the second authentication target information (ID2, PW2) (au2, electronic signature thereof, and id2, for example). The second information may, for example, be the information AU2 itself, a cryptogram of the information AU2, or a hash value of the information AU2 or a cryptogram of the hash value (step S142a-2).

The second information is received by the receiver 162 of the authentication server apparatus 16 (FIG. 4B), and the information AU2 corresponding to the second information is sent to the communication processor 163 (step S162-2). The communication processor 163 sends the information AU2 to the authentication unit 164 (step S163-2). The authentication unit 164 uses the information AU2 and the second authentication process information stored in the storage 161 to carry out the process of authenticating the information AU2 and sends a result of the authentication (OK/NG) to the communication processor 163. For example, in the case where the second authentication method is an authentication method using a public key cryptography, the authentication unit 164 extracts a public key corresponding to the identifier id2 stored in the identifier area ID2, which corresponds to the information AU2, from the storage 161 and uses the public key to validate the signature for the second authentication information au21 stored in the password area PW2, which corresponds to the information AU2. In a case where the signature validation succeeds, the authentication unit 164 sends an authentication result (OK) representing that the authentication has succeeded to the communication processor 163, otherwise the authentication unit 164 sends an authentication result (NG) representing that the authentication has failed to the communication processor 163. Instead, in the case where the second authentication method is an authentication method using biometric authentication, the authentication unit 164 extracts "information corresponding to a characteristic quantity of the body" corresponding to the identifier id2 stored in the identifier area ID2, which corresponds to the information AU2, from the storage 161 and determines whether the extracted information corresponds to the second authentication information au21 stored in the password area PW2, which corresponds to the information AU2. In a case where the "information corresponding to a characteristic quantity of the body" corresponds to the second authentication information au21, the authentication unit 164 sends an authentication result (OK) representing that the authentication has succeeded to the communication processor 163, otherwise the authentication unit 164 sends an authentication result (NG) representing that the authentication has failed to the communication processor 163. Still instead, in the case where the second authentication method is an authentication method using information unique to a physical device, the authentication unit 164 extracts a "hash value of the information unique to the physical device" corresponding to the identifier id2 stored in the identifier area ID2, which corresponds to the information AU2, from the storage 161 and determines whether the extracted value corresponds to the second authentication information au21 stored in the password area PW2, which corresponds to the information AU2. In a case where the "hash value of the information unique to the physical device" corresponds to the second authentication information au21, the authentication unit 164 sends an authentication result (OK) representing that the authentication has succeeded to the communication processor 163, otherwise the authentication unit 164 sends an authentication result (NG) representing that the authentication has failed to the communication processor 163. The authentication unit 164 sends the authentication result (NG) representing that the authentication has failed to the communication processor 163 also in a case where the second authentication information corresponding to ID2 is not stored in the storage 161 (step S164-2). The communication processor 163 sends the authentication result (OK/NG) to the transmitter 165, and the transmitter 165 transmits the authentication result (OK/NG) to the authentication control server apparatus 14 (step S165-2).

The authentication result (OK/NG) (result of authentication performed by second authentication server apparatus on the basis of second information) is received by the receiver 141b of the authentication control server apparatus 14 (FIG. 3) and sent to the communication processor 145 (step S141b-2). The communication processor 145 sends the authentication result (OK/NG) to the transmitter 142b, and the transmitter 142b transmits the authentication result (OK/NG) (authentication result information) to the communication server apparatus 13 (step S145-2). The communication server apparatus 13 uses the authentication result (OK/NG) to carry out the following process. For example, in the case where the authentication result is successful (OK), the communication server apparatus 13 carries out the process of allowing the client apparatus 12 to log in. In the case where the authentication result is unsuccessful (NG), the communication server apparatus 13 sends the error display information to the client apparatus 12 and requests the client apparatus 12 to input a password again. In the case where the authentication result is successively unsuccessful (NG) multiple times determined in advance, the communication server apparatus 13 handles the access as an unauthorized log-in process and can lock the account of the client apparatus 12, prohibit the log-in process for a fixed period, or impose any other penalty (step S142b-2).

<Features of Present Embodiment>

When the client apparatus 12 corresponding to the newly introduced second authentication method attempts to access the communication server apparatus 13, the client apparatus 12 converts the second input authentication information having a data content compliant with the second authentication method into the second authentication target information (ID2, PW2) in the data formnn compliant with the first authentication method and transmits information corresponding to the second authentication target information (ID2, PW2) to the communication server apparatus 13. The communication server apparatus 13 transmits the information corresponding to the second authentication target information (ID2, PW2) to the authentication control server apparatus 14 and acquires a result of the authentication (OK/NG) of the information. In this process, the data form of the information inputted to and outputted from the communication server apparatus 13 is the data form of the first authentication method, which is the same as that previously used. Further, the number of actions of input and output of information to and from the communication server apparatus 13 is also equal to the number in the case of the data form of the first authentication method, which is previously used. The second authentication method can therefore be introduced with substantially no change in the setting of the communication server apparatus 13. On the other hand, since the data content of the second authentication target information (ID2, PW2) corresponds to the second authentication method, use of the second authentication method safer than the first authentication method improves the safety of the system.

When the client apparatus 11 corresponding to the first authentication method, which is previously used, attempts to access the communication server apparatus 13, the client apparatus 11 takes the first input authentication information having a data content compliant with the first authentication method as the first authentication target information (ID1, PW1) in the data form compliant with the first authentication method and transmits information corresponding to the first authentication target information (ID1, PW1) to the communication server apparatus 13. The communication server apparatus 13 transmits the information corresponding to the first authentication target information (ID1, PW1) to the authentication control server apparatus 14 and acquires a result of the authentication (OK/NG) of the information. In this process, since the first authentication target information (ID1, PW1) transmitted by the client apparatus 11 complies with the first authentication method, which is the same as that previously used, the setting of the client apparatus 11 does not need to be changed. Further, the setting of the authentication control server apparatus 14 substantially does not need to be changed.

As described above, the client apparatus 11 corresponding to the first authentication method, which is the same as that previously used, and the client apparatus 12 corresponding to the new second authentication method are allowed to concurrently operate with no change in the setting of the communication server apparatus 13. The new second authentication method is therefore readily introduced. Further, different authentication methods are allowed to be used on a user basis.

[First Modification of First Embodiment]

In the first embodiment, the information (sc1 or sc2) representing the authentication method is stored in part of the password area comprised in the authentication target information. The information representing the authentication method may instead be stored in part of the identifier area, in both the password area and the identifier area, or in another area comprised in the authentication target information.

Second Embodiment

In the first embodiment, the determination information for identification of the authentication method is stored in the header area of the password area, and the authentication control server apparatus uses only the determination information to identify the authentication method. In a case where the authentication target information in the data form compliant with the first authentication method comprises no information for identification of the authentication method, however, the method described above cannot be used. In the present embodiment, a relation table that relates the determination information to an authentication method corresponding thereto is stored in the authentication control server apparatus, and the authentication control server apparatus uses also the relation table to identify the authentication method. In the following sections, points different from those in the first embodiment will be primarily described, and descriptions of the portions common to the items described above will be simplified by use of the same reference numbers.

<Configuration>

An authentication control system 2 according to the present embodiment comprises client apparatus 21 and 22, the communication server apparatus 13, an authentication control server apparatus 24 (server apparatus), and the authentication server apparatus 15 and 16, as shown in FIG. 1. The client apparatus 21, 22 and the communication server apparatus 13 can communicate with each other via a network, and the authentication control server apparatus 24 can communicate with the communication server apparatus 13 and the authentication server apparatus 15 and 16 via a network. The client apparatus 21 and 22 provided in the authentication control system 2 according to the present embodiment are each formed of one client apparatus but may instead be formed of a plurality of client apparatus. Similarly, the communication server apparatus 13, the authentication control server apparatus 24, and the authentication server apparatus 15 and 16 may each be formed of a plurality of apparatus.

The client apparatus 21 according to the present embodiment comprises the input unit 112, an arithmetic unit 213, the transmitter 115, the receiver 116, and the output unit 117, as shown in FIG. 2A. The client apparatus 22 according to the present embodiment comprises the storage 121, the input unit 122, the arithmetic unit 123, a data form converter 224, the transmitter 125, the receiver 126, and the output unit 127, as shown in FIG. 2B.

The authentication control server apparatus 24 according to the present embodiment comprises the receivers 141a and 141b, the transmitter 142a, the transmitter 142b, the determination unit 243, a data form converter 244, storage 246, and the communication processor 145, as shown in FIG. 3.

<Pre-Process>

The authentication generation information for generation of second input authentication information having a data content compliant with the second authentication method is stored in the client apparatus 22 in place of the client apparatus 12. Further, a relation table that identifies the authentication method corresponding to the determination information is stored in the storage 246 of the authentication control server apparatus 24. For example, a relation table (list) formed of a plurality of sets of an identifier idn (determination information) related to the information sc1 or sc2 representing the authentication method employed by the client apparatus to which the identifier is allocated is stored in the storage 246 (FIG. 6C). The other points are the same as those in the pre-process in the first embodiment.

<Process of Authenticating Client Apparatus 21>

A description will be made of the process of authenticating the client apparatus 21 that attempts to access the communication server apparatus 13. The identifier id1 (first identifier) and the password pw1 (first input authentication information having data content compliant with first authentication method) are first inputted to the input unit 112 of the client apparatus 21 (FIG. 2A) (step S212-1). The identifier id1 and the password pw1 are sent to the arithmetic unit 213, and the arithmetic unit 213 generates the first authentication target information (ID1, PW1) formed of the identifier id1 and the password pw1 in the data form compliant with the first authentication method and outputs the first authentication target information (ID1, PW1). The second embodiment differs from the first embodiment in that the authentication method cannot be identified only from the first authentication target information (ID1, PW1). For example, the arithmetic unit 113 generates the first authentication target information (ID1, PW1) having the identifier id1 stored in the identifier area TD1 and the password pw1 stored in the password area PW1 and outputs the first authentication target information (ID1, PW1) (step S213-1). Steps S115-1, S13-1, and S141a-1 described in the first embodiment are then carried out, and the first authentication target information (ID1, PW1) is sent to the determination unit 243. It is, however, noted that the processes described above are carried out by the authentication control server apparatus 24 in place of the authentication control server apparatus 14.

The determination unit 243 determines whether the data content of the first authentication target information (ID1, PW1) complies with the first authentication method or the second authentication method. The determination unit 243 according to the present embodiment performs the determination by using the identifier id1 (determination information) stored in the identifier area ID1 and the relation table (FIG. 6C) stored in the storage 246 (step S243-1). In the relation table, sc1 representing the first authentication method is related to the identifier id1. The determination unit 243 therefore determines that the data content of the first authentication target information (ID1, PW1) complies with the first authentication method. In this case, the first authentication target information (ID1, PW1) is sent to the transmitter 142a, and the transmitter 142a transmits the first information corresponding to the first authentication target information (ID1, PW1) to the authentication server apparatus 15 (step S142a-1). The following processes (processes in steps S152-1 to S142b-1) are the same as those in the first embodiment. It is, however, noted that these processes are carried out by the authentication control server apparatus 24, the client apparatus 21 and 22 in place of the authentication control server apparatus 14 and the client apparatus 11 and 12. In a case where the identifier stored in the identifier area ID1 is not stored in the relation table, the determination unit 243 transmits information representing that a result of the authentication is unsuccessful (NG) to the communication server apparatus 13.

<Process of Authenticating Client Apparatus 22>

A description will be made of the process of authenticating the client apparatus 22 that attempts to access the communication server apparatus 13. Steps S122-2 and S123-2 described in the first embodiment are first carried out. It is, however, noted that the processes in the steps described above are carried out by the client apparatus 22 in place of the client apparatus 12.

The identifier id2 and the second authentication information au21 (second input authentication information having data content compliant with second authentication method) are sent to the data form converter 224. The data form converter 224 converts the identifier id2 and the second authentication information au21 into the second authentication target information (ID2, PW2) in the data form compliant with the first authentication method different from the second authentication method (converts second input authentication information having data content compliant with second authentication method different from first authentication method into second authentication target information in data form compliant with first authentication method). The second embodiment differs from the first embodiment in that the authentication method cannot be identified only from the second authentication target information (ID2, PW2). For example, the data form converter 224 generates the second authentication target information (ID2, PW2) having the identifier id2 stored in the identifier area ID2 and the second authentication information au21 stored in the password area PW2, as shown in FIG. 6B, and outputs the second authentication target information (step S214-2). Steps S125-2, S13-2, and S141a-2 described in the first embodiment are then carried out, and the second authentication target information (TD2, PW2) is sent to the determination unit 243 (FIG. 3). It is, however, noted that the processes in the steps described above are carried out by the authentication control server apparatus 24 in place of the authentication control server apparatus 14.

The determination unit 243 determines whether the data content of the second authentication target information (ID2, PW2) complies with the first authentication method or the second authentication method. The determination unit 243 according to the present embodiment performs the determination by using the identifier id2 (determination information) stored in the identifier area ID2 and the relation table (FIG. 6C) stored in the storage 246 (step S243-2). In the relation table, sc2 representing the second authentication method is related to the identifier id2. The determination unit 243 therefore determines that the data content of the second authentication target information (ID2, PW2) complies with the second authentication method. In this case, the second authentication target information (ID2, PW2) is inputted to the data form converter 244, and the data form converter 244 obtains and outputs information AU2 representing the content of the second authentication target information (ID2, PW2). The information AU2 is sent to the transmitter 142a, and the transmitter 142a transmits second information corresponding to the second authentication target information (ID2, PW2) to the authentication server apparatus 16 (step S142a-2). The following processes (processes in steps S163-2 to S142b-2) are the same as those in the first embodiment. It is, however, noted that these processes are carried out by the authentication control server apparatus 24, the client apparatus 21 and 22 in place of the authentication control server apparatus 14 and the client apparatus 11 and 12. In a case where the identifier stored in the identifier area ID2 is not stored in the relation table, the determination unit 243 transmits information representing that a result of the authentication is unsuccessful (NG) to the communication server apparatus 13.

<Features of Present Embodiment>

The present embodiment can provide the same advantageous effects as those provided by the first embodiment. The present embodiment further allows introduction of a new authentication method with no change in the setting of the existing communication server apparatus or client apparatus even in a case where authentication target information in the data form compliant with the first authentication method comprises no information that identifies the authentication method.

Third Embodiment

In some case, input authentication information has a large amount of data content compliant with the second authentication method and cannot therefore be directly changed to input authentication information having the data form compliant with the first authentication method. In the present embodiment, a pre-authentication process between the second authentication server apparatus and a client apparatus corresponding to the second authentication method is carried out, and an identifier corresponding to a result of the pre-authentication is used to generate authentication target information in the data form compliant with the first authentication method. In the following sections, points different from those in the first embodiment will be primarily described, and descriptions of the portions common to the items described above will be simplified by use of the same reference numbers.

<Configuration>

An authentication control system 3 according to the present embodiment comprises the client apparatus 11 and a client apparatus 32, the communication server apparatus 13, an authentication control server apparatus 34 (server apparatus), and the authentication server apparatus 15 and an authentication server apparatus 36, as shown in FIG. 1. The client apparatus 11, 32 and the communication server apparatus 13 can communicate with each other via a network, and the authentication control server apparatus 34 can communicate with the communication server apparatus 13 and the authentication server apparatus 15 and 36 via a network. The client apparatus 32 can further communicate with the authentication server apparatus 36 via a network. The client apparatus 11 and 32 provided in the authentication control system 3 according to the present embodiment are each formed of one client apparatus but may instead be formed of a plurality of client apparatus. Similarly, the communication server apparatus 13, the authentication control server apparatus 34, and the authentication server apparatus 15 and 36 may each be formed of a plurality of apparatus.

The client apparatus 32 according to the present embodiment comprises the storage 121, the input unit 122, an arithmetic unit 323 (pre-authentication unit), the data form converter 124, the transmitter 125, the receiver 126, and the output unit 127, as shown in FIG. 2B. The authentication control server apparatus 34 according to the present embodiment comprises the receivers 141a and 141b, the transmitter 142a (provision unit), the transmitter 142b, the determination unit 143, a data form converter 344, and the communication processor 145, as shown in FIG. 3. The authentication server apparatus 36 according to the present embodiment comprises the storage 161, the receiver 162, a communication processor 363, an authentication unit 364, and the transmitter 165, as shown in FIG. 4B.

<Pre-Process>

The pre-process in the third embodiment is the same as that in the first embodiment. It is, however, noted that the pre-process carried out on the client apparatus 12 described above is carried out on the client apparatus 32 in place of the client apparatus 12.

<Process of Authenticating Client Apparatus 11>

The authentication process in the third embodiment is the same as that in the first embodiment.

<Process of Authenticating Client Apparatus 32>

A description will be made of the process of authenticating the client apparatus 32 that attempts to access the communication server apparatus 13. The identifier id2 (second identifier) and the authentication information au2 other than the password are first inputted to the input unit 122 of the client apparatus 32 (FIG. 2B). The identifier id2 and the authentication information au2 are sent to the arithmetic unit 323, and the arithmetic unit 323 uses the identifier id2 and the authentication information au2 as well as the authentication generation information stored in the storage 121 to set pre-authentication information au21' corresponding to the authentication information au2. The pre-authentication information au21' is, for example, the same as the second authentication information au21 described in the first embodiment. The arithmetic unit 323 generates a pre-authentication request AU2'=(id2, au21') containing the identifier id2 and the pre-authentication information au21' and sends the pre-authentication request AU2' to the transmitter 125 (step S323-21). The transmitter 125 transmits the pre-authentication request AU2' to the authentication server apparatus 36 (step S325-2).

The pre-authentication request AU2' is received by the receiver 162 of the authentication server apparatus 36 (FIG. 4B) and sent to the communication processor 363 (step S362-21). The communication processor 363 sends the pre-authentication request AU2' to the authentication unit 364 (step S363-21). The authentication unit 364 uses the pre-authentication request AU2' and the second authentication process information stored in the storage 161 to carry out the process of authenticating the pre-authentication request AU2'. The authentication process is the same as that performed by the authentication unit 164 in the first embodiment. In a case where a result of the authentication of the pre-authentication request AU2' is unsuccessful (NG), the unsuccessful pre-authentication result (NG) is sent to the communication processor 363, further sent to the transmitter 165, and transmitted from the transmitter 165 to the client apparatus 32. On the other hand, in a case where a result of the authentication of the pre-authentication request AU2' is successful (OK), the identifier id2 in the pre-authentication request AU2' having a successful authentication result is related to information representing that the authentication result is successful (OK), and the identifier id2 related to the information is stored in the storage 161. Further, the successful pre-authentication result (OK) and the identifier id2 are sent to the communication processor 363, further sent to a transmitter 165, and transmitted from the transmitter 165 to the client apparatus 32 (step S364-21).

The information sent from the authentication server apparatus 36 is received by the receiver 126 of the client apparatus 32 (FIG. 2B) and sent to the arithmetic unit 323. In the case where the pre-authentication result is unsuccessful (NG), the arithmetic unit 323 may prompt the client apparatus 32 to attempt the authentication process again, or in a case where the pre-authentication result is successively unsuccessful (NG) multiple times determined in advance, the arithmetic unit 323 handles the access as an unauthorized log-in process and can lock the account of the client apparatus 32, prohibit the log-in process for a fixed period, or impose any other penalty. On the other hand, in the case where the pre-authentication result is successful (OK), the arithmetic unit 323 sends the identifier id2 and a null value au21 as the "input authentication information having a data content compliant with the second authentication method" to the data form converter 124 (step S323-2).

The data form converter 124 converts the identifier id2 and au21 into the second authentication target information (TD2, PW2) in the data form compliant with the first authentication method (step S324-2), as described in the first embodiment. The second authentication target information (ID2, PW2) is sent to the transmitter 125, and the transmitter 125 transmits information corresponding to the second authentication target information (ID2, PW2) to the communication server apparatus 13 (step S125-2).

The communication server apparatus 13 to which the information corresponding to the second authentication target information (ID2, PW2) has been transmitted transmits the information to the authentication control server apparatus 34 (step S33-2).

The information corresponding to the second authentication target information (ID2, PW2) is received by the receiver 141a of the authentication control server apparatus 34 (FIG. 3). The receiver 141a sends the second authentication target information (ID2, PW2) obtained from the information corresponding to the second authentication target information (ID2, PW2) to the determination unit 143 (step S141a-2). The determination unit 143 determines whether the data content of the second authentication target information (ID2, PW2) complies with the first authentication method or the second authentication method (step S143-2). The determination unit 143 determines that the data content of the second authentication target information (ID2, PW2) complies with the second authentication method, as described above. In this case, the second authentication target information (ID2, PW2) is inputted to the data form converter 344, and the data form converter 344 obtains and outputs information AU2 representing the content of the second authentication target information (ID2, PW2). The information AU2 is sent to the transmitter 142a, and the transmitter 142a transmits second information corresponding to the information AU2 (second information corresponds to information comprising information corresponding to identifier id2) to the authentication server apparatus 36 (step S342a-2).

The second information is received by the receiver 162 of the authentication server apparatus 36 (FIG. 4B), and the information AU2 corresponding to the second information is sent to the communication processor 363 (step S162-2). The communication processor 363 sends the information AU2 to the authentication unit 364 (step S363-2). The authentication unit 364 determines whether the identifier id2 represented by the information AU2 coincides with an identifier related to the information representing that the pre-authentication result is successful (OK). When a result of the determination shows that they coincide with each other, the authentication unit 364 issues a successful authentication result (OK), whereas when a result of the determination shows that they do not coincide with each other, the authentication unit 364 issues an unsuccessful authentication result (NG). The authentication result (OK/NG) (result of re-authentication performed by second authentication server apparatus by using information corresponding to second identifier) is sent to the communication processor 363 (step S364-2). The communication processor 363 sends the authentication result (OK/NG) to the transmitter 165, and the transmitter 165 transmits the authentication result (OK/NG) to the authentication control server apparatus 34 (step S365-2). The following processes are the same as those in the first embodiment (processes in steps S141b-2 to S142b-2).

<Features of Present Embodiment>

The present embodiment can provided the same advantageous effects as those provided by the first embodiment. Further, in the present embodiment, the identifier id2 and the null value au21 according to a result of the pre-authentication are converted into the second authentication target information (ID2, PW2) in the data form compliant with the first authentication method. The second authentication target information (ID2, PW2) can therefore be generated even in a case where input authentication information has a large amount of data content compliant with the second authentication method and cannot therefore be directly changed to input authentication information having the data form compliant with the first authentication method.

[First Modification of Third Embodiment]

In the third embodiment, the identifier id2 inputted to the input unit 122 of the client apparatus 32 is used as the "second identifier." Instead, a onetime token that is a onetime password newly generated by the authentication server apparatus 36 may be used as the "second identifier." The authentication performed by the client apparatus 32 in this case will be described below.

The identifier id2 (third identifier) and the authentication information au2 other than the password are first inputted to the input unit 122 of the client apparatus 32 (FIG. 2B) (step S122'-2). The identifier id2 and the authentication information au2 are sent to the arithmetic unit 323, and steps S323-21, S325-2, S362-21, and S363-21 described above are carried out.

The authentication unit 364 of the authentication server apparatus 36 (FIG. 4B) to which the pre-authentication request AU2' has been sent in step S363-21 uses the pre-authentication request AU2' and the second authentication process information stored in the storage 161 to carry out the process of authenticating the pre-authentication request AU2'. In the case where a result of the authentication of the pre-authentication request AU2' is unsuccessful (NG), the unsuccessful pre-authentication result (NG) is sent to the communication processor 363, further sent to the transmitter 165, and transmitted from the transmitter 165 to the client apparatus 32. On the other hand, in the case where a result of the authentication of the pre-authentication request AU2' is successful (OK), the authentication unit 364 newly generates a random onetime token as an identifier id2' (second identifier), relates the identifier id2' to information representing the successful authentication result (OK), and stores the identifier id2' related to the information in the storage 161. Further, the successful pre-authentication result (OK) and the identifier id2' are sent to the communication processor 363, further sent to the transmitter 165, and transmitted from the transmitter 165 to the client apparatus 32 (step S364'-21).

The information sent from the authentication server apparatus 36 is received by the receiver 126 of the client apparatus 32 (FIG. 2B) and sent to the arithmetic unit 323. In the case where the pre-authentication result is unsuccessful (NG), the arithmetic unit 323 may prompt the client apparatus 32 to attempt the authentication process again, or in a case where the pre-authentication result is successively unsuccessful (NG) multiple times determined in advance, the arithmetic unit 323 handles the access as an unauthorized log-in process and can lock the account of the client apparatus 32, prohibit the log-in process for a fixed period, or impose any other penalty. On the other hand, in the case where the pre-authentication result is successful (OK), the arithmetic unit 323 sends the identifier id2' and the null value au21 as the "input authentication information having a data content compliant with the second authentication method" to the data form converter 124 (step S323'-2).

The data form converter 124 converts the identifier id2' and au21 into the second authentication target information (ID2, PW2) in the data form compliant with the first authentication method (step S324'-2), as described in the first embodiment. The second authentication target information (ID2, PW2) is sent to the transmitter 125, and the transmitter 125 transmits information corresponding to the second authentication target information (TD2, PW2) to the communication server apparatus 13 (step S125-2). The following processes with id2 replaced with id2' (steps S33-2, S141a-2, S143-2, S342a-2, S162-2, S363-2, S364-2, and S365-2 described above and the following processes in the first embodiment) are then carried out.

[Second Modification of Third Embodiment]

A second modification of the third embodiment shows a specific example of the pre-authentication process carried out by the authentication server apparatus 36. In the specific example, the identifier id2 (third identifier) and the authentication information au2 that is a PIN code (arbitrary number) are first inputted to the input unit 122 of the client apparatus 32 (FIG. 2B) (step S122'-2). The identifier id2 and the authentication information au2 are sent to the arithmetic unit 323. The arithmetic unit 323 uses the identifier id2 and the authentication information au2 as well as the authentication generation information stored in the storage 121 to set the pre-authentication information au21' corresponding to the authentication information au2. In the second modification, the arithmetic unit 323 generates the pre-authentication request au21' as described below.

The arithmetic unit 323 first acquires a value Ti, generates an integer random number x, and calculates $A=H(id2)\in G_1$, $T=H_T(T_i|id2)\in G_1$, $D=A+T$, $U=xD$, and $W=xA$, where A, T, D, U, and W are elements of a group $G_1$ (cyclic group, for example). For example, in a case where a group G is formed of rational points on an elliptical curve EC, $\mu M \in G$ for an integer $\mu$ and an element M of the group G Me G represents g-multiplication (scalar multiplication) on the elliptical curve EC. H(id2) denotes a hash value obtained by operating a hash function on id2, and $H_T(T_i|id2)$ denotes a hash value obtained by operating a hash function on $T_i|id2$. $T_i$ denotes a value representing the current time slot (time segment) and can be acquired from a server apparatus that is not shown. $T_i|id2$ denotes bit concatenation between $T_i$ and id2. The arithmetic unit 323 acquires information representing the current point of time (current time, for example) CCT and generates a random number (onetime random information) nonce. The arithmetic unit 323 operates a hash function hash on the bit concatenation id2|U|W|nonce|CCT of id2, U, W, nonce, and CCT to calculate an integer y=hash (id2|U|W|nonce|CCT). The arithmetic unit 323 further calculates $V=-(x+y)(((s-au2)A+au2\cdot A)+sT)\in G_1$, where s denotes integer authentication generation information (master secret information) stored in the storage 161 of the authentication server apparatus 36 (FIG. 4B). Further, au2 in the present modification is also an integer. The arithmetic unit 323 performs the calculation by sending au2, A, and T to the authentication server apparatus 36 and acquiring (s−au2)A and sT from the authentication server apparatus 36. That is, the arithmetic unit 323 sends au2, A, and T to the transmitter 125, and the transmitter 125 transmits au2, A, and T to the authentication server apparatus 36. The values au2, A, and T are received by the receiver 162 of the authentication server apparatus 36 and sent to the communication processor 363. The communication processor 363 sends au2, A, and T to the authentication unit 364. The authentication unit 364 reads authentication generation information s from the storage 161, calculates (s−au2)A and sT, and sends the results of the calculation to the communication processor 363, and the communication processor 363 sends (s−au2)A and sT to the transmitter 165. The transmitter 165 transmits (s−au2)A and sT to the client apparatus 32. The values (s−au2)A and sT are received by the receiver 126 and sent to the arithmetic unit 323. The arithmetic unit 323 uses x, y, au2, A, (s−au2)A, and sT to obtain $V=-(x+y)(((s-au2)A+au2\cdot A)+sT)$. The arithmetic unit 323 sets the pre-authentication information au21' to be (U, W, V, nonce, CCT).

The arithmetic unit 323 generates the pre-authentication request AU2'=(id2, au21')=(id2, U, W, V, nonce, CCT) containing the identifier id2 and the pre-authentication information au21'=(U, W, V, nonce, CCT) and sends the pre-authentication request AU2' to the transmitter 125 (step s323-21). Steps S325-2, S362-21, and S363-21 described above are then carried out.

The authentication unit 364 of the authentication server apparatus 36 to which the pre-authentication request AU2' has been sent in step S363-21 uses the pre-authentication request AU2' and the second authentication process information s (master secret information) stored in the storage 161 to carry out the process of authenticating the pre-authentication request AU2'. The authentication unit 364 first acquires information representing the current point of time (current time, for example) SCT. In a case where a difference |SCT−CCT| between the point of time SCT and the point of time CCT comprised in AU2' is greater than a predetermined value THt, the authentication unit 364 issues an unsuccessful pre-authentication result (NG) (authentication has failed). The predetermined value THt is, for example, 5 minutes and may instead be any other period. Further, also in a case where the random number (onetime random information) nonce comprised in the pre-authentication request having been pre-authenticated (hereinafter referred to as "nonce'") coincides with nonce comprised in the current AU2', the authentication unit 364 issues an unsuccessful pre-authentication result (NG) (authentication has failed). This process can, for example, be achieved by storing nonce' comprised in pre-authentication requests having been pre-authenticated in a predetermined time segment (for example, a time segment from the point of time expressed by SCT−THt to the point of time expressed by SCT+THt) in the storage 161. The nonce' comprised in pre-authentication requests having been pre-authenticated before SCT−THt may be discarded. In a case where no unsuccessful result occurs in the processes described above, the authentication unit 364 acquires $T_i$ from the server apparatus that has been described above but is not shown and uses the pre-authentication request AU2' to calculate y=hash(id2|U|W|nonce CCT), D=H(id2)+$H_T$($T_i$|id2), and g=e(V, Q)·e(U+yD, sQ)∈$G_T$, where e($\alpha_1$, $\alpha_2$) denotes bilinear mapping (paring, for example) that uses, as an input, an element $\alpha_1$ of a group $G_1$ and an element $\alpha_2$ of a group $G_2$ (cyclic group, for example) to provide an element e($\alpha_1$, $\alpha_2$) of a group $G_T$, and Q represents a generator of the group $G_2$. In a case where the pre-authentication information au21' is appropriate, g=1∈$G_T$ is obtained from the nature of bilinear mapping. On the other hand, in a case where the pre-authentication information au21' is inappropriate, g≠1∈$G_T$ is obtained at a high possibility. In the case of g≠1, the authentication unit 364 issues an unsuccessful pre-authentication result (NG) (authentication has failed), whereas in the case of g=1, the authentication unit 364 issues a successful pre-authentication result (OK). In the example described above, in a case where the length of the time slot is sufficiently greater than the length represented by THt (for example, length of time slot is one day, THt represents 5 minutes), $T_i$ acquired by the arithmetic unit 323 described above typically coincides with $T_i$ acquired by the authentication unit 364. On the other hand, in a case where the arithmetic unit 323 incidentally acquires $T_i$ in a certain time slot, and the authentication unit 364 incidentally acquires $T_i$ in the following time slot, the authentication unit 364 issues an unsuccessful pre-authentication result even when the authentication unit 364 should issue a successful pre-authentication result. The problem can be solved by the following method:

Step I: The authentication unit 364 uses $T_i$ representing the current time slot to calculate g as described above. The authentication unit 364 issues a successful authentication result when g=1, whereas the authentication unit 364 proceeds to step II when g≠1.

Step II: The authentication unit 364 uses $T_i$ representing the time slot immediately before the current time slot to calculate g as described above. The authentication unit 364 issues a successful authentication result when g=1, whereas the authentication unit 364 issues an unsuccessful authentication result when g≠1 again.

In the case where a result of the authentication of the pre-authentication request AU2' is unsuccessful (NG), the unsuccessful pre-authentication result (NG) is sent to the communication processor 363, further sent to the transmitter 165, and transmitted from the transmitter 165 to the client apparatus 32. On the other hand, in the case where a result of the authentication of the pre-authentication request AU2' is successful (OK), the authentication unit 364 newly generates a random onetime token as the identifier id2' (second identifier), relates the identifier id2' to the information representing that the authentication result is unsuccessful (OK), and stores the identifier id2' related to the information in the storage 161. The successful pre-authentication result (OK) and the identifier id2' are sent to the communication processor 363, further sent to the transmitter 165, and transmitted from the transmitter 165 to the client apparatus 32 (step S364'-21). The following processes have been described in the first modification of the third embodiment (processes in steps S323'-2 to S365-2 and the following processes in first embodiment).

In the method described above, the authentication server apparatus 36 issues an unsuccessful pre-authentication result in the case where nonce' comprised in pre-authentication requests having been pre-authenticated coincides with nonce comprised in the current AU2'. Since y corresponds to nonce, a change in nonce results in a change in y. A man-in-the-middle attack made by re-use of AU2' can therefore be avoided. Further, if past nonce' is deleted from the storage 161 of the authentication server apparatus 36, whether or not nonce' coincides with nonce comprised in the current AU2' cannot be determined, and a man-in-the-middle attack cannot therefore be avoided. In the present modification, an unsuccessful pre-authentication result is issued in the case where the difference |SCT-CCT| is greater than the predetermined value THt. Therefore, even in the case where past nonce' is deleted, a man-in-the-middle attack made by re-use of nonce' can be avoided.

As another modification, instead of causing the authentication unit 364 to generate a random onetime token as the identifier id2' (second identifier), nonce comprised in the pre-authentication information au21'=(U, W, V, nonce, CCT) having a successful authentication result (OK) may be used as the identifier id2'. No new onetime token thus needs to be generated. Still instead, a function value of nonce may be used as the identifier id2'.

[Third Modification of Third Embodiment]

The third embodiment and the first and second modifications thereof are modifications of the first embodiment. Instead, the same processes as those carried out in the third embodiment and the first and second modifications thereof may be carried out as a modification of the second embodiment. That is, in the second embodiment, the second authentication target information (ID2, PW2) may comprise the identifier id2 or id2' corresponding to the pre-authentication process carried out by the authentication server apparatus 36, the second information may correspond to information comprising the information corresponding to the identifier id2 or id2', and a result of the authentication performed by the authentication server apparatus 36 may be a result of re-authentication performed by the authentication server apparatus 36 by using the information corresponding to the identifier id2.

Fourth Embodiment

A fourth embodiment is a modification of the first embodiment. In the first embodiment, the determination unit 143 of the authentication control server apparatus 14 determines whether the data content of authentication target information, which is the first authentication target information (ID1, PW1) or the second authentication target information (ID2, PW2), complies with the first authentication method or the second authentication method. The information corresponding to the authentication target information is transmitted to the authentication server apparatus 15 or the authentication server apparatus 16 in accordance with a result of the determination. The determination may not, however, be performed. Any configuration can be employed as long as the "first process," in which the authentication control server apparatus provides the authentication server apparatus 15 with the first information corresponding to the authentication target information, and the "second process," in which the authentication control server apparatus provides the authentication server apparatus 16 with the second information corresponding to the authentication target information, can both be carried out and an authentication result can be provided from each of the authentication server apparatus 15 and 16. That is, in a case where although the data content of authentication target information does not comply with the first authentication method, the first information corresponding to the authentication target information is transmitted to the authentication server apparatus 15, which carries out an authentication process compliant with the first authentication method, (in the case of the first process), the authentication fails (NG). Similarly, in a case where the data content of the authentication target information does not comply with the second authentication method, the second information corresponding to the authentication target information is transmitted to the authentication server apparatus 16, which carries out an authentication process compliant with the second authentication method, (in the case of the second process), the authentication fails (NG). Therefore, the authentication control server apparatus may first carry out the first or second process, and in the case where the resultant authentication result is unsuccessful (NG), the other process (the second process in a case where the first process is carried out or the first process in a case where the second process is carried out) may then be carried out. In the case where the second process is first carried out, and when the resultant authentication result is unsuccessful (NG), the first process may then be carried out, whereas in the case where the first process is first carried out, and when the resultant authentication result is unsuccessful (NG), the second process may then be carried out. When an authentication result is successful (OK) in the process having been first carried out, the other process is not carried out, and an authentication result (OK) representing that the authentication has succeeded is returned to the communication server apparatus 13. Also when an authentication result is successful (OK) in the other process, an authentication result (OK) representing that the authentication has succeeded is returned to the communication server apparatus 13. On the other hand, when an authentication result is unsuccessful (NG) in both the first and second processes, an authentication result (NG) representing that the authentication has failed is returned to the communication server apparatus 13. A specific example shown below is an example in which an authentication control server apparatus first carries out the second process, and when the resultant authentication result is unsuccessful (NG), the first process is then carried out.

<Configuration>

Figure 7:
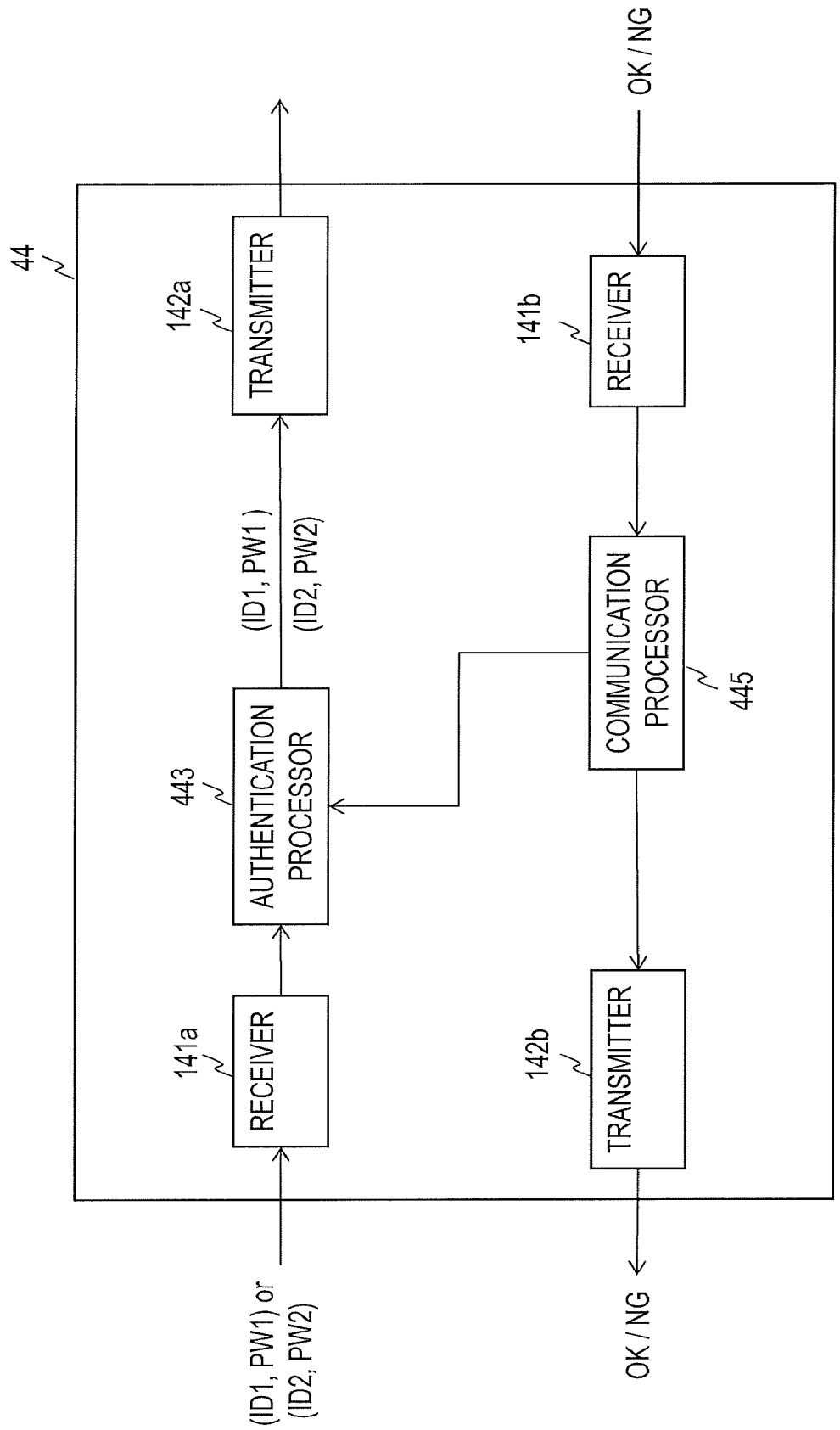
FIG. 7 is a block diagram showing an authentication control server apparatus (server apparatus) according to an embodiment.
Figure 8:
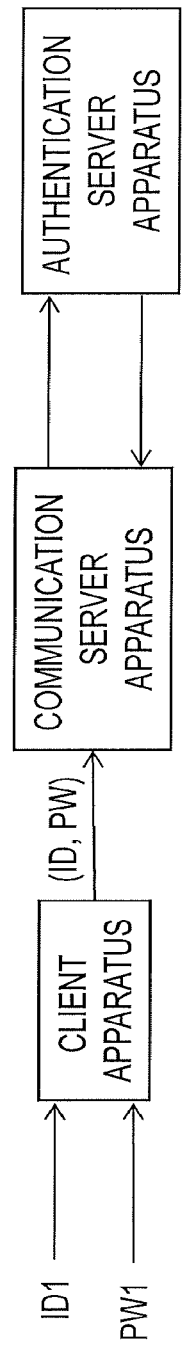
FIG. 8 is a block diagram showing an authentication control system of related art.

An authentication control system 4 according to the present embodiment is the same as the authentication control system 1 according to the first embodiment except that the authentication control server apparatus 14 is replaced with an authentication control server apparatus 44, as shown in FIG. 1. The authentication control server apparatus 44 according to the present embodiment comprises the receivers 141a and 141b, the transmitter 142a (provision unit), the transmitter 142b, an authentication processor 443, and a communication processor 445, as shown in FIG. 7. The other configurations are the same as those in the first embodiment.

<Pre-Process>

The pre-process in the fourth embodiment is the same as that in the first embodiment.

<Process of Authenticating Client Apparatus 11>

The fourth embodiment differs from the first embodiment in that the processes carried out by the authentication control server apparatus 14 described above are replaced as described below. It is, however, noted that the header area H1 of PW1 in the first authentication target information (ID1, PW1) is not required. The area H1 may be null or may store the first authentication target information (ID1, PW1) as shown in FIG. 6A. The information corresponding to the first authentication target information (ID1, PW1) transmitted in step S13-1 is received by the receiver 141a of the authentication control server apparatus 44 (FIG. 7). The receiver 141a sends the first authentication target information (ID1, PW1) obtained from the information corresponding to the first authentication target information (ID1, PW1) to the authentication processor 443.

The authentication processor 443 first sends the first authentication target information (ID1, PW1) to the transmitter 142a, and the transmitter 142a transmits second information corresponding to the first authentication target information (ID1, PW1) to the authentication server apparatus 16 (second process). The second information is received by the receiver 162 of the authentication server apparatus 16 (FIG. 4B), and the information AU2 corresponding to the second information is sent to the communication processor 163. The communication processor 163 sends the information AU2 to the authentication unit 164. The authentication unit 164 uses the information AU2 and the second authentication process information stored in the storage 161 to carry out the process of authenticating the information AU2 and sends a result of the authentication (OK/NG) to the communication processor 163. The communication processor 163 sends the authentication result (OK/NG) to the transmitter 165, and the transmitter 165 transmits the authentication result (OK/NG) to the authentication control server apparatus 44. The authentication result (OK/NG) is received by the receiver 141b of the authentication control server apparatus 44 and sent to the communication processor 445. When the authentication result is successful (OK), the communication processor 445 sends the authentication result (OK) to the transmitter 142b, and the transmitter 142b transmits the authentication result (OK) (authentication result information) to the communication server apparatus 13. The processes described in the first embodiment are then carried out.

On the other hand, when the authentication result is unsuccessful (NG), the unsuccessful authentication result (NG) is sent to the authentication processor 443. In this case, the authentication processor 443 sends the first authentication target information (ID1, PW1) to the transmitter 142a, and the transmitter 142a transmits first information corresponding to the first authentication target information (ID1, PW1) to the authentication server apparatus 15 (first process). The first information is received by the receiver 152 of the authentication server apparatus 15 (FIG. 4A), and information corresponding to the first authentication target information (ID1, PW1) is sent to the communication processor 153. The communication processor 153 sends the information corresponding to the first authentication target information (ID1, PW1) to the authentication unit 154 (step S153-1). The authentication unit 154 uses the information corresponding to the first authentication target information (ID1, PW1) and the first authentication process information stored in the storage 151 to carry out the process of authenticating the first authentication target information (ID1, PW1) and sends an authentication result (OK/NG) to the communication processor 153. The communication processor 153 sends the authentication result (OK/NG) to the transmitter 155, and the transmitter 155 transmits the authentication result (OK/NG) to the authentication control server apparatus 44. The authentication result (OK/NG) is received by the receiver 141b of the authentication control server apparatus 44 and sent to the communication processor 445. The communication processor 445 sends the authentication result (OK/NG) to the transmitter 142b, and the transmitter 142b transmits the authentication result (OK/NG) (authentication result information) to the communication server apparatus 13. The following processes are the same as those in the first embodiment.

<Process of Authenticating Client Apparatus 12>

The fourth embodiment differs from the first embodiment in that the processes carried out by the authentication control server apparatus 14 described above are replaced as described below. It is, however, noted that the header area H2 of PW2 in the second authentication target information (TD2, PW2) is not required. The area H2 may be null or may store the second authentication target information (ID2, PW2) as shown in FIG. 6B. The information corresponding to the second authentication target information (ID2, PW2) transmitted in step S13-2 is received by the receiver 141a of the authentication control server apparatus 44 (FIG. 7). The receiver 141a sends the second authentication target information (ID2, PW2) obtained from the information corresponding to the second authentication target information (ID2, PW2) to the authentication processor 443.

The authentication processor 443 first sends the second authentication target information (ID2, PW2) to the transmitter 142a, and the transmitter 142a transmits second information corresponding to the second authentication target information (ID2, PW2) to the authentication server apparatus 16 (second process). The second information is received by the receiver 162 of the authentication server apparatus 16 (FIG. 4B), and the information AU2 corresponding to the second information is sent to the communication processor 163. The communication processor 163 sends the information AU2 to the authentication unit 164. The authentication unit 164 uses the information AU2 and the second authentication process information stored in the storage 161 to carry out the process of authenticating the information AU2 and sends a result of the authentication (OK/NG) to the communication processor 163. The communication processor 163 sends the authentication result (OK/NG) to the transmitter 165, and the transmitter 165 transmits the authentication result (OK/NG) to the authentication control server apparatus 44. The authentication result (OK/NG) is received by the receiver 141b of the authentication control server apparatus 44 and sent to the communication processor 445. When the authentication result is successful (OK), the communication processor 445 sends the authentication result (OK) to the transmitter 142b, and the transmitter 142b transmits the authentication result (OK) (authentication result information) to the communication server apparatus 13. The processes described in the first embodiment are then carried out.

On the other hand, when the authentication result is unsuccessful (NG), the unsuccessful authentication result (NG) is sent to the authentication processor 443. In this case, the authentication processor 443 sends the second authentication target information (ID2, PW2) to the transmitter 142a, and the transmitter 142a transmits first information corresponding to the second authentication target information (ID2, PW2) to the authentication server apparatus 15 (first process). The first information is received by the receiver 152 of the authentication server apparatus 15 (FIG. 4A), and information corresponding to the second authentication target information (ID2, PW2) is sent to the communication processor 153. The communication processor 153 sends the information corresponding to the second authentication target information (ID2, PW2) to the authentication unit 154. The authentication unit 154 uses the information corresponding to the second authentication target information (ID2, PW2) and the first authentication process information stored in the storage 151 to carry out the process of authenticating the second authentication target information (ID2, PW2) and sends a result of the authentication (OK/NG) to the communication processor 153. The communication processor 153 sends the authentication result (OK/NG) to the transmitter 155, and the transmitter 155 transmits the authentication result (OK/NG) to the authentication control server apparatus 44. The authentication result (OK/NG) is received by the receiver 141b of the authentication control server apparatus 44 and sent to the communication processor 445. The communication processor 445 sends the authentication result (OK/NG) to the transmitter 142b, and the transmitter 142b transmits the authentication result (OK/NG) (authentication result information) to the communication server apparatus 13 (step S445-2). The following processes are the same as those in the first embodiment.

[First Modification of Fourth Embodiment]

In the third embodiment, the determination unit of the authentication control server apparatus may not determine whether the data content of authentication target information, which is the first authentication target information (ID1, PW1) or the second authentication target information (TD2, PW2), complies with the first authentication method or the second authentication method. That is, in the third embodiment, the authentication control server apparatus may first carry out the first or second process, and in the case where the resultant authentication result is unsuccessful (NG), the other process (the second process in the case where the first process is carried out or the first process in the case where the second process is carried out) may then be carried out, as in the fourth embodiment. When an authentication result is successful (OK) in the process having been first carried out, the other process is not carried out, and the authentication result (OK) representing that the authentication has succeeded is returned to the communication server apparatus 13. Also when an authentication result is successful (OK) in the other process, the authentication result (OK) representing that the authentication has succeeded is returned to the communication server apparatus 13. On the other hand, when an authentication result is unsuccessful (NG) in both the first and second processes, the authentication result (NG) representing that the authentication has failed is returned to the communication server apparatus 13.

The pre-process and the process of authenticating the client apparatus 11 in the present modification are the same as those in the fourth embodiment. The process of authenticating the client apparatus 32 in the present modification will be described below.

<Process of Authenticating the Client Apparatus 32>

The processes in steps S122-2 to S33-2 described in the process of authenticating the client apparatus 32 in the third embodiment are first carried out. The information corresponding to the second authentication target information (ID2, PW2) transmitted in step S33-2 is received by the receiver 141a of the authentication control server apparatus 44 (FIG. 7). The receiver 141a sends the second authentication target information (ID2, PW2) obtained from the information corresponding to the second authentication target information (ID2, PW2) to the authentication processor 443.

The authentication processor 443 first sends the second authentication target information (ID2, PW2) to the transmitter 142a, and the transmitter 142a transmits second information corresponding to the second authentication target information (ID2, PW2) to the authentication server apparatus 36 (second process). The second information is received by the receiver 162 of the authentication server apparatus 36 (FIG. 4B), and the information AU2 corresponding to the second information is sent to the communication processor 363. The communication processor 363 sends the information AU2 to the authentication unit 364. The authentication unit 364 carries out the process of authenticating the information AU2, as described in the third embodiment, and sends a result of the authentication (OK/NG) (result of re-authentication performed by second authentication server apparatus by using information corresponding to second identifier) to the communication processor 363. The communication processor 363 sends the authentication result (OK/NG) to the transmitter 165, and the transmitter 165 transmits the authentication result (OK/NG) to the authentication control server apparatus 44. The authentication result (OK/NG) is received by the receiver 141b of the authentication control server apparatus 44 and sent to the communication processor 445. When the authentication result is successful (OK), the communication processor 445 sends the authentication result (OK) to the transmitter 142b, and the transmitter 142b transmits the authentication result (OK) (authentication result information) to the communication server apparatus 13. The processes described in the first embodiment are then carried out.

On the other hand, when the authentication result is unsuccessful (NG), the unsuccessful authentication result (NG) is sent to the authentication processor 443. In this case, the authentication processor 443 sends the second authentication target information (ID2, PW2) to the transmitter 142a, and the transmitter 142a transmits first information corresponding to the second authentication target information (TD2, PW2) to the authentication server apparatus 15 (first process). The first information is received by the receiver 152 of the authentication server apparatus 15 (FIG. 4A), and information corresponding to the second authentication target information (ID2, PW2) is sent to the communication processor 153. The communication processor 153 sends the information corresponding to the second authentication target information (TD2, PW2) to the authentication unit 154. The authentication unit 154 uses the information corresponding to the second authentication target information (ID2, PW2) and the first authentication process information stored in the storage 151 to carry out the process of authenticating the second authentication target information (ID2, PW2) and sends a result of the authentication (OK/NG) to the communication processor 153. The communication processor 153 sends the authentication result (OK/NG) to the transmitter 155, and the transmitter 155 transmits the authentication result (OK/NG) to the authentication control server apparatus 44. The authentication result (OK/NG) is received by the receiver 141b of the authentication control server apparatus 44 and sent to the communication processor 445. The communication processor 445 sends the authentication result (OK/NG) to the transmitter 142b, and the transmitter 142b transmits the authentication result (OK/NG) (authentication result information) to the communication server apparatus 13 (step S445-2). The following processes are the same as those in the first embodiment.

[Second Modification of Fourth Embodiment]

As a further modification of the first modification of the fourth embodiment, a onetime token that is a onetime password newly generated by the authentication server apparatus 36 may be used as the "second identifier," as described in the first modification of the third embodiment. Further, as the pre-authentication process, the pre-authentication process in the second modification of the third embodiment may be used.

[Other Modifications and Others]

The present invention is not limited to the embodiments described above. For example, when any of the authentication control server apparatus 14, 24, and 34 determines that the data content of authentication target information does not comply with the second authentication method, first information corresponding to the authentication target information may be transmitted to the authentication server apparatus 15 (first authentication server apparatus). Further, when any of the authentication control server apparatus 14, 24, and 34 determines that the data content of authentication target information does not comply with the first authentication method, second information corresponding to the authentication target information may be transmitted to the authentication server apparatus 16 or 36 (second authentication server apparatus).

When the data content of authentication target information complies with the second authentication method, any of the authentication control server apparatus 14, 24, and 34 may further transmit the first information to the authentication server apparatus 15 (first authentication server apparatus). In this case, when the data content of the authentication target information complies with the first authentication method or does not comply with the second authentication method, any of the authentication control server apparatus 14, 24, and 34 transmits authentication result information representing a result of the authentication performed by the first authentication server apparatus on the basis of the first information to the communication server apparatus 13. Further, when the data content of the authentication target information complies with the second authentication method, any of the authentication control server apparatus 14, 24, and 34 transmits authentication result information based on both a result of the authentication performed by the authentication server apparatus 15 (first authentication server apparatus) on the basis of the first information and a result of the authentication performed by the authentication server apparatus 16 (second authentication server apparatus) on the basis of the second information to the communication server apparatus 13. The authentication result information based on both a result of the authentication performed by the authentication server apparatus 15 and a result of the authentication performed by the authentication server apparatus 16 is, for example, as follows:

Example 1

When both the authentication results are successful (OK), the authentication result information shows that the authentication has succeeded (OK), otherwise the authentication result information shows that the authentication has failed (NG).

Example 2

When both the authentication results are unsuccessful (NG), the authentication result information shows that the authentication has failed (NG), otherwise the authentication result information shows that the authentication has succeeded (OK).

In a case where a typical security level is required, the processes in the embodiments described above may be carried out, whereas in a case where a high security level is required, the processes described above may be carried out. To improve the security level, (Example 1) is preferable to (Example 2). Further, (Example 1) is desirable in a case where the authentication performed by the authentication server apparatus 15 is essential from a viewpoint of the system configuration, a case where the authentication performed by the authentication server apparatus 15 is required by another system and the other system cannot be changed, and other cases.

In the case of the configurations described above, the onetime token described in the first modification of the third embodiment may be used as the password pwn. The process of authenticating the client apparatus 32 in this case will be described below.

Steps S122'-2, S323-21, S325-2, S362-21, and S363-21 are first carried out. The authentication unit 364 of the authentication server apparatus 36 (FIG. 4B) to which the pre-authentication request AU2'=(id2, au21') has been transmitted in step S363-21 uses the pre-authentication request AU2' and the second authentication process information stored in the storage 161 to carry out the process of authenticating the pre-authentication request AU2'. In the case where a result of the authentication of the pre-authentication request AU2' is unsuccessful (NG), the unsuccessful pre-authentication result (NG) is sent to the communication processor 363, further sent to the transmitter 165, and transmitted from the transmitter 165 to the client apparatus 32. On the other hand, in the case where a result of the authentication of the pre-authentication request AU2' is successful (OK), the authentication unit 364 newly generates a random onetime token as the identifier id2' (second identifier), relates the identifier id2' to the information on the successful authentication result (OK), and stores the identifier id2' related to the information in the storage 161. Further, the related identifier id2' and the identifier id2 are so set as to be allowed to be referred to by the authentication unit 154 of the authentication server apparatus 15. As a result, the identifier id2' can be used as the password pwn. The successful pre-authentication result (OK) and the identifier id2' are sent to the communication processor 363, further sent to the transmitter 165, and transmitted from the transmitter 165 to the client apparatus 32 (step S364"-21).

The information sent from the authentication server apparatus 36 in step S364"-2 is received by the receiver 126 of the client apparatus 32 (FIG. 2B) and sent to the arithmetic unit 323. The process to be carried out in the case where the pre-authentication result is unsuccessful (NG) has been described above. On the other hand, in the case where the pre-authentication result is successful (OK), the arithmetic unit 323 sends the identifier id2 and the second authentication information au21=id2' as the "input authentication information having a data content compliant with the second authentication method" to the data form converter 124 (step S323"-2). The data form converter 124 converts the identifier id2 and the second authentication information au21=id2' into the second authentication target information (ID2, PW2) in the data form compliant with the first authentication method. The identifier id2 is stored in the identifier area ID2, the information sc2 (determination information for determination of authentication method) representing the second authentication method is stored in the header area H2 of the password area PW2, and fixed-length letter string information representing the second authentication information au21=id2' is stored in the body area B2 (step S324"-2). The second authentication target information (ID2, PW2) is sent to the transmitter 125, and the transmitter 125 transmits information corresponding to the second authentication target information (ID2, PW2) to the communication server apparatus 13 (step S125-2). The communication server apparatus 13 to which the information corresponding to the second authentication target information (ID2, PW2) has been transmitted transmits the information corresponding to the second authentication target information (ID2, PW2) to the authentication control server apparatus 34 (step S33-2).

The information corresponding to the second authentication target information (ID2, PW2) is received by the receiver 141a of the authentication control server apparatus 34 (FIG. 3). The receiver 141a sends the second authentication target information (ID2, PW2) obtained from the information corresponding to the second authentication target information (ID2, PW2) to the determination unit 143 (step S141a-2). The determination unit 143 determines whether the data content of the second authentication target information (ID2, PW2) complies with the first authentication method or the second authentication method (step S143-2). The determination unit 143 determines that the data content of the second authentication target information (ID2, PW2) complies with the second authentication method, as described above. In this case, steps S342a-2, S162-2, S363-2, S364-2, and S365-2 described above with id2 being equal to id2' are first carried out. In place of step S364-2, the authentication unit 364 may determine whether or not the identifier au2=id2' represented by the information AU2 coincides with an identifier related to the information representing that the pre-authentication result is successful (OK). When a result of the determination shows that they coincide with each other, the authentication unit 364 may issue a successful authentication result (OK), whereas when a result of the determination shows that they do not coincide with each other, the authentication unit 364 may issue an unsuccessful authentication result (NG).

When the authentication result is successful (OK), the second authentication target information (TD2, PW2) is sent to the transmitter 142*a*, and the transmitter 142*a* transmits information corresponding to the second authentication target information (ID2, PW2) to the authentication server apparatus 15. The information corresponding to the second authentication target information (ID2, PW2) is received by the receiver 152 of the authentication server apparatus 15 (FIG. 4A), and the information corresponding to the second authentication target information (ID2, PW2) is sent from the communication processor 153 to the authentication unit 154. The authentication unit 154 refers to the information corresponding to the second authentication target information (ID2, PW2) as well as the set of the identifier id2' and the identifier id2 stored in the storage 161 of the authentication server apparatus 36, takes the identifier id2' as the password pwn, and carries out the process of authenticating the password in the second authentication target information (ID2, PW2). For example, the authentication unit 154 searches the storage 161 by using the identifier in the identifier area ID2, and determines whether the identifier id2' related to an identifier id2 that coincides with the identifier in the identifier area ID2 coincides with the second authentication information au21 stored in the body area B2 of the password area PW2. When the identifier id2' coincide with the second authentication information au21, the authentication unit 154 sends an authentication result (OK) representing that the authentication has succeeded (OK) to the communication processor 153, otherwise the authentication unit 154 sends an authentication result (NG) representing that the authentication has failed (NG) to the communication processor 153. The communication processor 153 sends the authentication result (OK/NG) to the transmitter 155, and the transmitter 155 transmits the authentication result (OK/NG) to the authentication control server apparatus 34.

The authentication result (OK/NG) is received by the receiver 141*b* of the authentication control server apparatus 34 (FIG. 3) and sent to the communication processor 145. The communication processor 145 sends the authentication result (OK/NG) to the transmitter 142*b*, and the transmitter 142*b* transmits the authentication result (OK/NG) to the communication server apparatus 13. The following processes have been described above.

The above embodiments have been described with reference to the case where the two authentication method, the first authentication method and the second authentication method, are used in the same system. Instead, three or more authentication methods comprising an n-th authentication method other than the first authentication method or the second authentication method may be used in the same system. In the case where the n-th authentication method is introduced, the processes in the embodiments described above may be carried out with the "second authentication method" replaced with the "n-th authentication method."

Further, the above description has been made of the case where the second authentication method is an authentication method other than the password authentication method. It is, however, noted that the second authentication method only needs to be an authentication method different from the first authentication method, and the second authentication method may, for example, be a password authentication method different from the first authentication method. Still instead, the first authentication method may be an authentication method other than the password authentication method.

In the embodiments described above, the data form converters 124 and 224 convert the identifier id2 and the second authentication information au21 into the second authentication target information (ID2, PW2) in the data form compliant with the first authentication method different from the second authentication method. The conversion may, however, be omitted as long as the identifier id2 and the second authentication information au21 already form the second authentication target information (ID2, PW2) in the data form compliant with the first authentication method (that is, the identifier id2 and the second authentication information au21 are directly used as the second authentication target information).

The client apparatus 11, 21, 12, 22, and 32 described above can instead be operated, for example, by using a script language on a web browser. In this case, the first authentication method of related art (password authentication method, for example) and a new second authentication method (authentication method using electronic signature, for example) may be allowed to be used in one client apparatus, and a user may be allowed to choose an authentication method to be used out of the two authentication methods.

The authentication control server apparatus 14, 24, and 34 may be provided with the function of an authentication server apparatus. In this case, the communication process in which the authentication control server apparatus 14, 24, and 34 transmits information to an authentication server apparatus and receives an authentication result from the authentication server apparatus can be omitted.

The variety of processes described above are not necessarily carried out only in a time course described above but may be concurrently or individually carried out in accordance with the processing perforrmnance of an apparatus that carries out the processes or as required. For example, the communication processor and the authentication unit of an authentication server apparatus may be apparatus that differ from each other and can communicate with each other via a network. In addition to the above, any change can, of course, be made to the processes described above as appropriate to the extent that the change does not depart from the substance of the present invention.

Each of the apparatus described above is configured, for example, by execution of a predetermined program executed by a general-purpose or dedicated computer that comprises a CPU (central processing unit) or any other processor (hardware processor) and a RAM (random-access memory), a ROM (read-only memory), or any other memory. The computer may comprise one processor and one memory or may comprise a plurality of processors and memories. The program may be installed on the computer or may be recorded, for example, in the ROM in advance. Further, instead of using electronic circuitry that achieves a functional configuration when the circuitry reads a program, such as a CPU, electronic circuitry that achieves a processing function without use of a program may be used to configure part or entirety of the processors. Further, electronic circuitry that forms one apparatus may comprise a plurality of CPUs.

To achieve each of the apparatus described above by using a computer, the process content of the function that should be provided by the apparatus is expressed in the form of a program. The program is executed by the computer to achieve the processing functions described above on the computer. The program in which the process contents are written can be recorded in a computer readable recording medium. The computer readable recording medium is, for example, a non-transitory recording medium. Examples of recording media of this type comprise a magnetic recording device, an optical disk, a magneto-optical recording medium, and a semiconductor memory.

The program is distributed, for example, by sale, transfer, and loan of a DVD, a CD-ROM, or any other portable recording medium on which the program is recorded. Further, the program may be stored in a storage device of a server computer, and the program may be transferred from the server computer to another computer via a network for distribution of the program.

The computer that executes the program, for example, first temporarily stores the program recorded on a portable recording medium or the program transferred from the server computer in a storage device of the computer. To carry out a process, the computer reads the program stored in the storage device of the computer and carries out processes according to the read program. As another form of execution of the program, the computer may directly read the program from a portable recording medium and execute processes according to the program. Further, whenever a program is transferred from the server computer to the computer, the computer may carry out a process according to the received program one by one. The processes described above may instead be carried out by using what is called an ASP-type service (ASP stands for application service provider), in which no program is transferred from the server computer to the computer but a processing function is achieved only by an instruction of execution of a program and acquisition of a result of the execution.

DESCRIPTION OF REFERENCE NUMERALS 1 to 3 Authentication control system
13 Communication server apparatus
14, 24, 34 Authentication control server apparatus (server apparatus)
15, 16, 36 Authentication server apparatus

What is claimed is:

1. A server apparatus comprising
processing circuitry configured to implement:
a receiver capable of receiving both information corresponding to first authentication target information having a data form and a data content compliant with a first authentication method and information corresponding to second authentication target information having a data form compliant with the first authentication method and a data content compliant with a second authentication method different from the first authentication method;
a provision unit capable of carrying out both a first process of providing a first authentication server apparatus that carries out an authentication process compliant with the first authentication method with first information corresponding to authentication target information that is the first authentication target information or the second authentication target information and a second process of providing a second authentication server apparatus that carries out an authentication process compliant with the second authentication method with second information corresponding to the authentication target information; and
a transmitter that transmits authentication result information based on at least one of a result of the authentication performed by the first authentication server apparatus based on the first information and a result of the authentication performed by the second authentication server apparatus based on the second information to a source from which the information corresponding to the authentication target information is transmitted.

2. The server apparatus according to claim 1,
wherein the provision unit carries out the first process when a result of the authentication of the second process performed by the second authentication server apparatus is unsuccessful.

3. The server apparatus according to claim 1,
further comprising processing circuitry configured to implement a determination unit that determines at least one of whether or not the data content of the authentication target information complies with the first authentication method and whether or not the data content of the authentication target information complies with the second authentication method different from the first authentication method,
wherein when the data content of the authentication target information complies with the first authentication method or does not comply with the second authentication method, the first information is provided to the first authentication server apparatus, and when the data content of the authentication target information complies with the second authentication method or does not comply with the first authentication method, the second information is provided to the second authentication server apparatus.

4. The server apparatus according to any of claims 1 to 3,
wherein the authentication target information contains an identifier area and a password area,
the first information corresponds to information containing a first identifier stored in the identifier area and first authentication information stored in the password area,
the second information corresponds to information containing a second identifier stored in the identifier area and second authentication information stored in the password area,
the first authentication information corresponds to a password, and
the second authentication information corresponds to authentication information other than the password.

5. The server apparatus according to any of claims 1 to 3,
wherein the authentication target information contains a second identifier corresponding to a pre-authentication process carried out by the second authentication server apparatus,
the second information corresponds to information comprising information corresponding to the second identifier, and
a result of the authentication performed by the second authentication server apparatus is a result of re-authentication performed by the second authentication server apparatus by using the information corresponding to the second identifier.

6. The server apparatus according to any of claims 1 to 3,
wherein the provision unit further provides the first authentication server apparatus with the first information when the data content of the authentication target information complies with the second authentication method,
the transmitter
transmits the authentication result information representing a result of the authentication performed by the first authentication server apparatus based on the first information to the source of transmission when the data content of the authentication target information complies with the first authentication method or does not comply with the second authentication method, and
transmits the authentication result information based both on a result of the authentication performed by the first authentication server apparatus based on the first information and a result of the authentication performed by the second authentication server apparatus based on the second information to the source of transmission when the data content of the authentication target information complies with the second authentication method.

7. The server apparatus according to claim 3,
wherein the authentication target information comprises determination information for determination of the authentication method, and
the determination unit uses at least the determination information to determine at least one of whether or not the data content of the authentication target information complies with the first authentication method and whether or not the data content of the authentication target information complies with the second authentication method different from the first authentication method.

8. The server apparatus according to claim 7,
wherein the determination unit further uses a relation table that identifies an authentication method corresponding to the determination information to determine at least one of whether or not the data content of the authentication target information complies with the first authentication method and whether or not the data content of the authentication target information complies with the second authentication method different from the first authentication method.

9. A non-transitory computer-readable medium storing a program that causes a computer to function as the server apparatus according to any of claims 1 to 3.

10. The server apparatus according to claim 4,
wherein the authentication target information contains the second identifier corresponding to a pre-authentication process carried out by the second authentication server apparatus,
the second information corresponds to information comprising information corresponding to the second identifier, and
a result of the authentication performed by the second authentication server apparatus is a result of re-authentication performed by the second authentication server apparatus by using the information corresponding to the second identifier.

11. The server apparatus according to claim 4,
wherein the provision unit further provides the first authentication server apparatus with the first information when the data content of the authentication target information complies with the second authentication method,
the transmitter
transmits the authentication result information representing a result of the authentication performed by the first authentication server apparatus based on the first information to the source of transmission when the data content of the authentication target information complies with the first authentication method or does not comply with the second authentication method, and
transmits the authentication result information based both on a result of the authentication performed by the first authentication server apparatus based on the first information and a result of the authentication performed by the second authentication server apparatus based on the second information to the source of transmission when the data content of the authentication target information complies with the second authentication method.

12. The server apparatus according to claim 5,
wherein the provision unit further provides the first authentication server apparatus with the first information when the data content of the authentication target information complies with the second authentication method,
the transmitter
transmits the authentication result information representing a result of the authentication performed by the first authentication server apparatus based on the first information to the source of transmission when the data content of the authentication target information complies with the first authentication method or does not comply with the second authentication method, and
transmits the authentication result information based both on a result of the authentication performed by the first authentication server apparatus based on the first information and a result of the authentication performed by the second authentication server apparatus based on the second information to the source of transmission when the data content of the authentication target information complies with the second authentication method.

13. A client apparatus comprising processing circuitry configured to implement:
a converter that converts input authentication information having a data content compliant with a second authentication method into authentication target information having a data form compliant with a first authentication method different from the second authentication method; and
a transmitter that transmits information corresponding to the authentication target information,
wherein the input authentication information comprises a second identifier and second authentication information corresponding to authentication information other than a password, and
the authentication target information comprises an identifier area where the second identifier is stored and a password area where the second authentication information is stored.

14. A client apparatus comprising processing circuitry configured to implement:
a converter that converts input authentication information having a data content compliant with a second authentication method into authentication target information having a data form compliant with a first authentication method different from the second authentication method; and
a transmitter that transmits information corresponding to the authentication target information,
the client apparatus further comprising processing circuitry configured to implement a pre-authentication unit that performs a pre-authentication process with a second authentication server apparatus and obtains a second identifier corresponding to the pre-authentication process,
wherein the input authentication information comprises the second identifier.

15. The client apparatus according to claim 14,
wherein the pre-authentication unit
generates new onetime information whenever the pre-authentication process is carried out,
provides the second authentication server apparatus with authentication information corresponding to the onetime information and pre-authentication information comprising the onetime information, and obtains the second identifier that corresponds to the pre-authentication process for the pre-authentication information from the second authentication server apparatus, and the pre-authentication process comprises a process of issuing unsuccessful authentication result when the onetime information corresponds to past onetime information.

16. The client apparatus according to claim 15, wherein the pre-authentication process comprises a process of issuing unsuccessful authentication result when the pre-authentication information is obtained earlier than a specified point of time.

17. The client apparatus according to claim 15, wherein the second identifier is information based on the onetime information.

18. A non-transitory computer-readable medium storing a program that causes a computer to function as the client apparatus according to any of claims 13 to 16.

19. The client apparatus according to claim 16, wherein the second identifier is information based on the onetime information.

20. An authentication control system comprising:
(a) a first hardware client apparatus that uses first input authentication information having a data content compliant with a first authentication method as first authentication target information having a data form compliant with the first authentication method and transmits information corresponding to the first authentication target information to a hardware communication server apparatus;
(b) a second hardware client apparatus that converts second input authentication information having a data content compliant with a second authentication method different from the first authentication method into second authentication target information having a data form compliant with the first authentication method and transmits information corresponding to the second authentication target information to the hardware communication server apparatus; and
(c) a hardware server apparatus that
receives information corresponding to authentication target information that is the first authentication target information or the second authentication target information from the hardware communication server apparatus,
is capable of carrying out both a first process of providing a first hardware authentication server apparatus that carries out an authentication process compliant with the first authentication method with first information corresponding to the authentication target information and a second process of providing a second hardware authentication server apparatus that carries out an authentication process compliant with the second authentication method with second information corresponding to the authentication target information, and
transmits authentication result information based on at least one of a result of the authentication performed by the first hardware authentication server apparatus based on the first information and a result of the authentication performed by the second hardware authentication server apparatus based on the second information to the hardware communication server apparatus.

21. An authentication control method comprising the steps of:
receiving both information corresponding to first authentication target information having a data form and a data content compliant with a first authentication method and information corresponding to second authentication target information having a data form compliant with the first authentication method and a data content compliant with a second authentication method different from the first authentication method at a receiver;
carrying out both a first process of providing a first authentication server apparatus that carries out an authentication process compliant with the first authentication method with first information corresponding to authentication target information that is the first authentication target information or the second authentication target information and a second process of providing a second authentication server apparatus that carries out an authentication process compliant with the second authentication method with second information corresponding to the authentication target information at a provision unit; and
transmitting authentication result information based on at least one of a result of the authentication performed by the first authentication server apparatus based on the first information and a result of the authentication performed by the second authentication server apparatus based on the second information to a source from which the information corresponding to the authentication target information is transmitted from a transmitter.

22. An authentication method comprising the steps of:
converting input authentication information having a data content compliant with a second authentication method into authentication target information having a data form compliant with a first authentication method different from the second authentication method at a converter; and
transmitting information corresponding to the authentication target information from a transmitter,
wherein the input authentication information comprises a second identifier and second authentication information corresponding to authentication information other than a password, and
the authentication target information comprises an identifier area where the second identifier is stored and a password area where the second authentication information is stored.

23. An authentication control method comprising the steps of:
(a) using first input authentication information having a data content compliant with a first authentication method as first authentication target information having a data form compliant with the first authentication method and transmitting information corresponding to the first authentication target information to a communication server apparatus at a first client apparatus;
(b) converting second input authentication information having a data content compliant with a second authentication method different from the first authentication method into second authentication target information having a data form compliant with the first authentication method and transmitting information corresponding to the second authentication target information to the communication server apparatus at a second client apparatus; and
(c) receiving information corresponding to authentication target information that is the first authentication target information or the second authentication target information from the communication server apparatus, carrying out both a first process of providing a first authentication server apparatus that carries out an authentication process compliant with the first authentication method with first information corresponding to the authentication target information and a second process of providing a second authentication server apparatus that carries out an authentication process compliant with the second authentication method with second information corresponding to the authentication target information, and transmitting authentication result information based on at least one of a result of the authentication performed by the first authentication server apparatus based on the first information and a result of the authentication performed by the second authentication server apparatus based on the second information to the communication server apparatus, at a server apparatus.

24. An authentication method comprising the steps of:

converting input authentication information having a data content compliant with a second authentication method into authentication target information having a data form compliant with a first authentication method different from the second authentication method at a converter;

transmitting information corresponding to the authentication target information from a transmitter; and performing a pre-authentication process with a second authentication server apparatus and obtaining a second identifier corresponding to the pre-authentication process at a pre-authentication unit, wherein the input authentication information comprises the second identifier.

\* \* \* \* \*